(12) United States Patent
Seton

(10) Patent No.: US 7,641,082 B2
(45) Date of Patent: Jan. 5, 2010

(54) APPLICATOR FOR PARTICULATE MATTER

(75) Inventor: Ian Seton, Kurrajong (AU)

(73) Assignee: Kenneth John Seton, Lane Cove, New South Wales (AU)

(*) Notice: Subject to any disclaimer, the term of this patent is extended or adjusted under 35 U.S.C. 154(b) by 562 days.

(21) Appl. No.: 11/409,008

(22) Filed: Apr. 24, 2006

(65) Prior Publication Data

US 2006/0243757 A1 Nov. 2, 2006

(51) Int. Cl.
*B67D 5/08* (2006.01)
(52) U.S. Cl. .............. 222/638; 222/175; 222/504; 222/559
(58) Field of Classification Search .......... 222/175, 222/191, 504, 638, 639, 642, 650, 561, 460, 222/462; 251/318, 326, 327, 328, 329
See application file for complete search history.

(56) References Cited

U.S. PATENT DOCUMENTS

| | | | | |
|---|---|---|---|---|
| 1,261,555 A * | 4/1918 | Knox | .............. | 137/247.11 |
| 2,486,387 A * | 11/1949 | Bringolf | .............. | 138/122 |
| 2,596,817 A | 5/1952 | McGovney | | |
| 2,772,659 A | 12/1956 | Tennis | | |
| 3,624,794 A * | 11/1971 | Futty | .............. | 222/154 |
| 3,642,201 A | 2/1972 | Potchen | | |
| 4,361,254 A * | 11/1982 | Teraoku et al. | .............. | 222/196 |
| 4,378,078 A | 3/1983 | Daniels | | |
| 4,437,595 A | 3/1984 | Stevens et al. | | |
| 4,497,280 A | 2/1985 | Sanstrom et al. | | |
| 4,773,568 A | 9/1988 | Schaefer | | |
| 4,949,674 A | 8/1990 | Young | | |
| 5,501,424 A | 3/1996 | Williams et al. | | |
| 5,735,231 A | 4/1998 | Terenzi | | |
| 5,823,224 A | 10/1998 | Gomez | | |
| 5,870,906 A | 2/1999 | Denisar | | |
| 5,944,231 A * | 8/1999 | Nuila | .............. | 222/175 |
| 6,062,166 A | 5/2000 | Macrina | | |
| 6,196,158 B1 | 3/2001 | Yang | | |
| 6,325,358 B1 | 12/2001 | Bower | | |
| 6,581,811 B1 * | 6/2003 | Schillaci | .............. | 224/148.2 |
| 2002/0092878 A1 * | 7/2002 | Seton et al. | .............. | 222/504 |
| 2003/0197148 A1 * | 10/2003 | Luke et al. | .............. | 251/326 |
| 2005/0230416 A1 * | 10/2005 | McMahon et al. | .............. | 222/1 |

FOREIGN PATENT DOCUMENTS

| | | |
|---|---|---|
| DE | 4026879 A | 2/1992 |
| GB | 1395702 A | 5/1975 |
| GB | 2105162 A | 3/1983 |
| SU | 1033874 A | 8/1983 |

\* cited by examiner

*Primary Examiner*—Kevin P Shaver
*Assistant Examiner*—Daniel R Shearer
(74) *Attorney, Agent, or Firm*—Molins & Co.

(57) ABSTRACT

An applicator for dry particulate matter has an operating module body having a handle and trigger. The applicator lacks a back-pack and particulate matter is instead stored in a flexible tube. A flow path in the body is partially blocked and fully opened by a battery operated reciprocating gate valve that can be operated by the trigger on the body's handle. The tube is long enough to pass around a user's neck when the operating module is held by a hand of the user's extended arm, so that the free end can be manipulated by the user's other hand. A microprocessor in the body is adapted to regulate the operation of the gate valve to adjust the quantity of particulate matter dispensed according to user inputs.

17 Claims, 27 Drawing Sheets

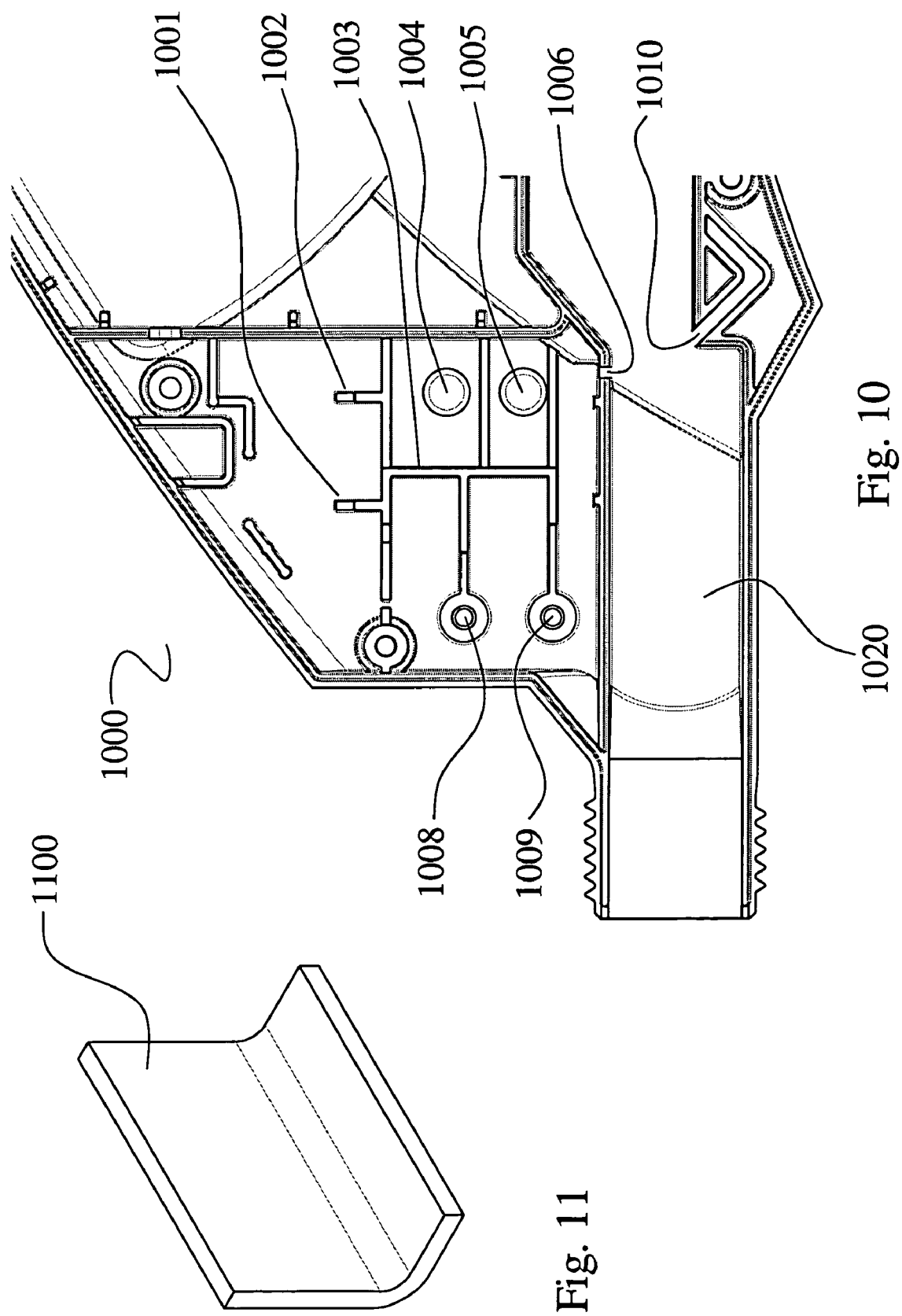

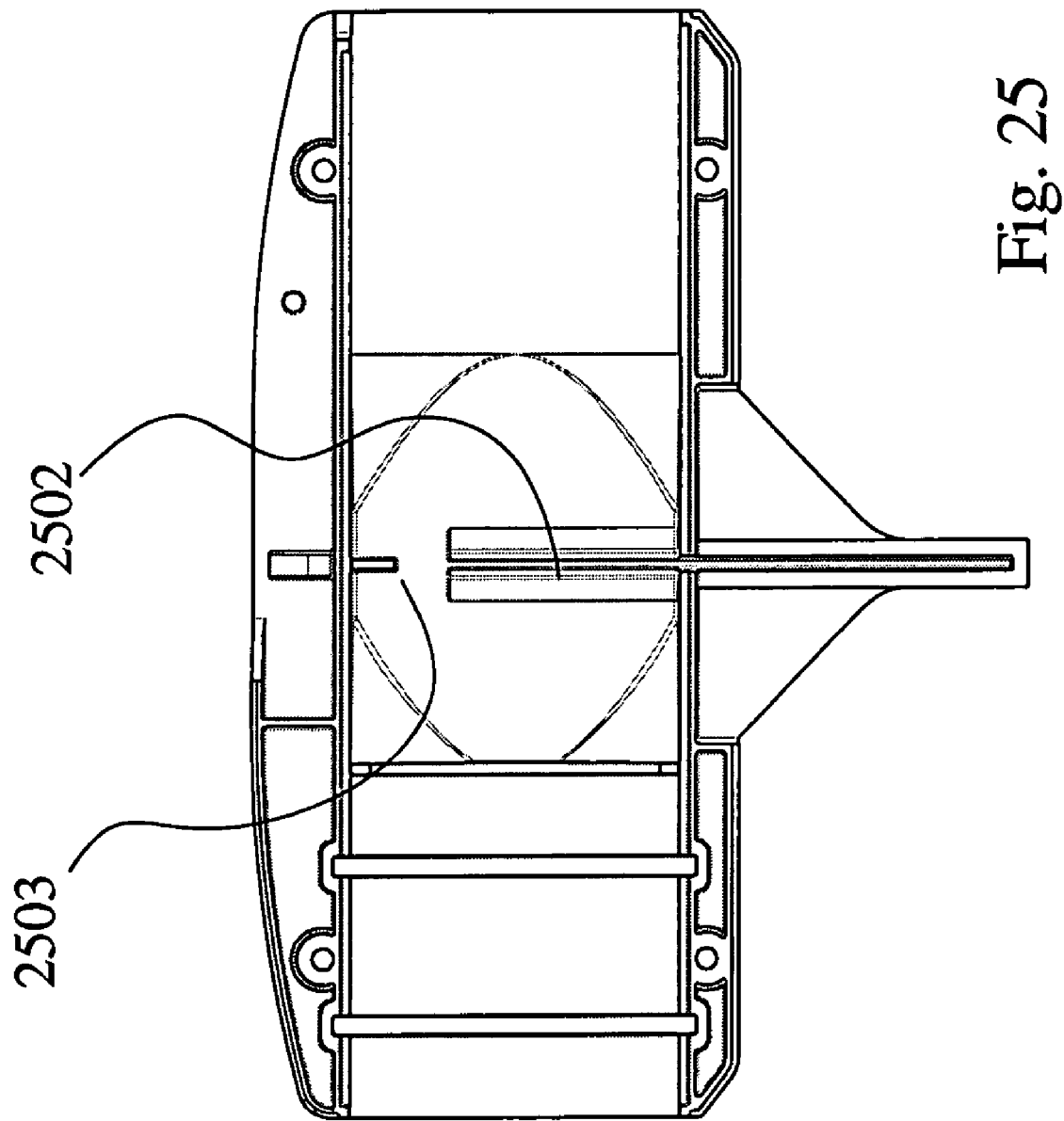
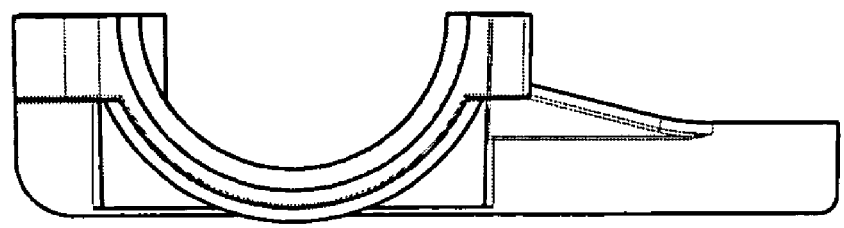
Fig. 25

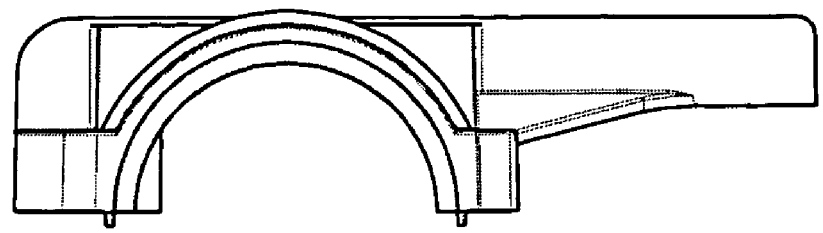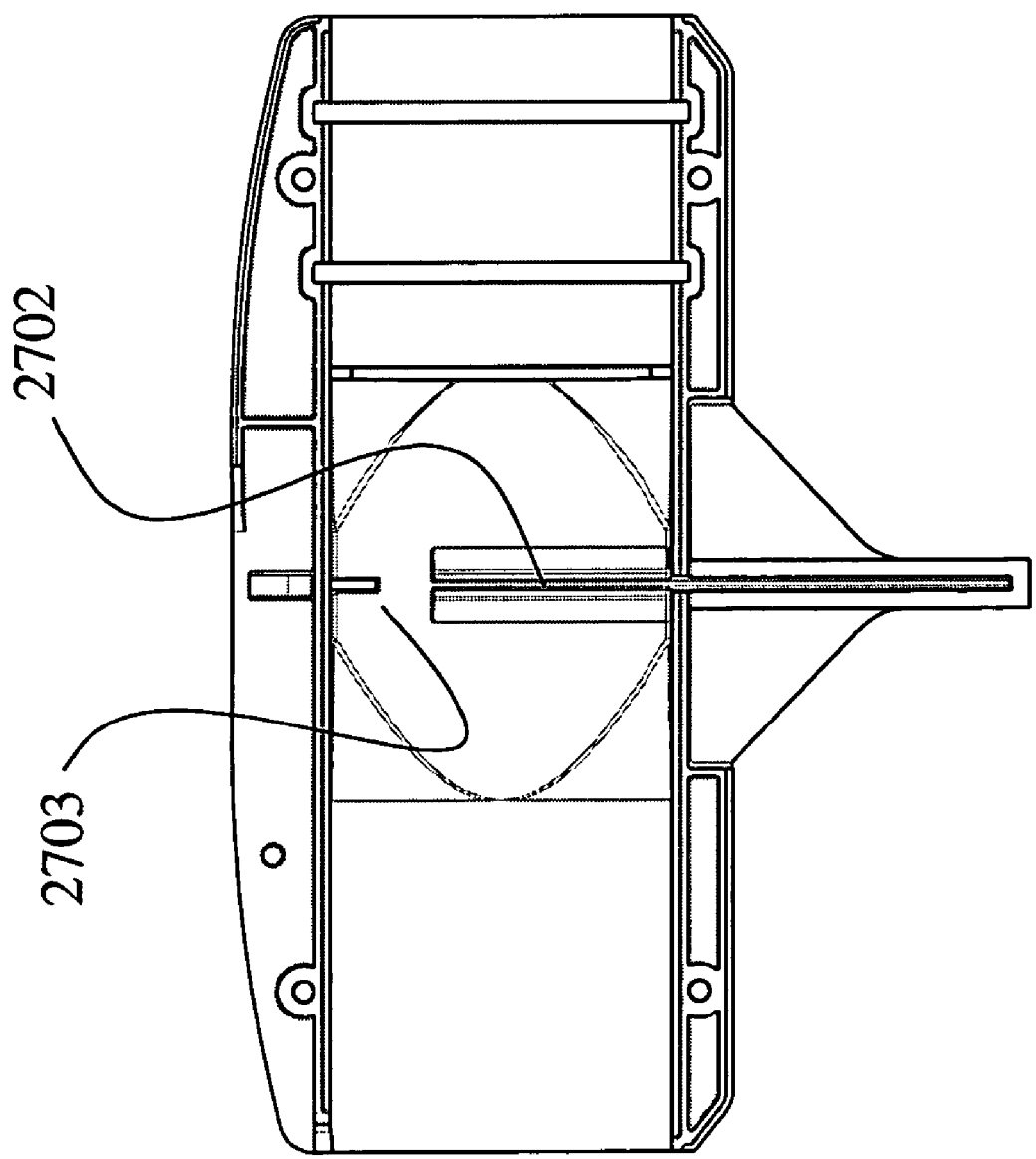
Fig. 27

APPLICATOR FOR PARTICULATE MATTER

FIELD OF THE INVENTION

The invention pertains to dispensers, and more particularly to equipment for measuring and dispensing dry particulate matter in small individually-measured quantities.

BACKGROUND OF THE INVENTION

Much of the motivation for the present invention arises from the needs of large commercial plant-production nurseries However, it will be appreciated that the resulting inventive solutions find use and application in a variety of dispensing and application environments such as for applying dry fertilizers and other dry granulated materials in the early stages of growth of open-area forestry and in general landscaping, and including the application of herbicides and pesticides in various situations.

Depending on the nature of the plants being grown, the climate and other factors, many large production nurseries have ongoing requirements such as the following:

a. The deposition of small individual quantities of dry particulate top dressings of fertilizers and sometimes pesticides and herbicides applied to the surface around plants growing in containers or in the ground, in both cases most usually in the open. These types of dressings are usually in the form of dry pellets or small spheres which range from about 3.0 mm to 5.0 mm ($1/8^{th}$ to $1/5$th inch) in diameter, and are sometimes much finer particles.

b. The application of small individually-measured quantities of dry fertilizer pellets or prills in a process immediately following "dibbling", which usually takes place in an immobile machine. In this latter process, containers for future plants are typically arranged in a row on a moving belt or rotating platform on a pot-filling machine. Immediately after each pot is filled with the growing medium, a hole is mechanically formed in the top of the growing medium for the specific purpose of receiving a small measured quantity of fertilizer, followed by a new plant.

Worldwide research to date has indicated that all current methods of measuring and applying such dry materials in small individual quantities in production nurseries are to some extent unsatisfactory.

In order to make these types of applications more efficient, equipment is required to perform such operations economically, accurately and quickly, while providing a higher degree of simplicity and reliability. Where the process occurs in the hands of the human operator, it is also required that the equipment be light and comfortable to use.

OBJECTS AND SUMMARY OF THE INVENTION

It is an object of the present invention to provide an applicator for small individually-measured doses of dry particulate matter such that it meets at least some of the above requirements.

A preferred embodiment of the present invention is comprised of an operating module having an internal flow path that is regulated by a solenoid activated gate valve.

BRIEF DESCRIPTION OF THE DRAWING FIGURES

FIG. 10 is an elevation of a section of the interior of the right-hand side molding depicted in FIG. 9, in greater detail.

FIG. 11 is an isometric view of the gap control metalwork for general use.

FIG. 25 shows an elevation and an end view of the left-hand side molding of a flow control module.

FIG. 27 is an elevation and an end view of a right-hand side equivalent of FIG. 25.

BEST MODE AND OTHER EMBODIMENTS OF THE INVENTION

Figure 1:
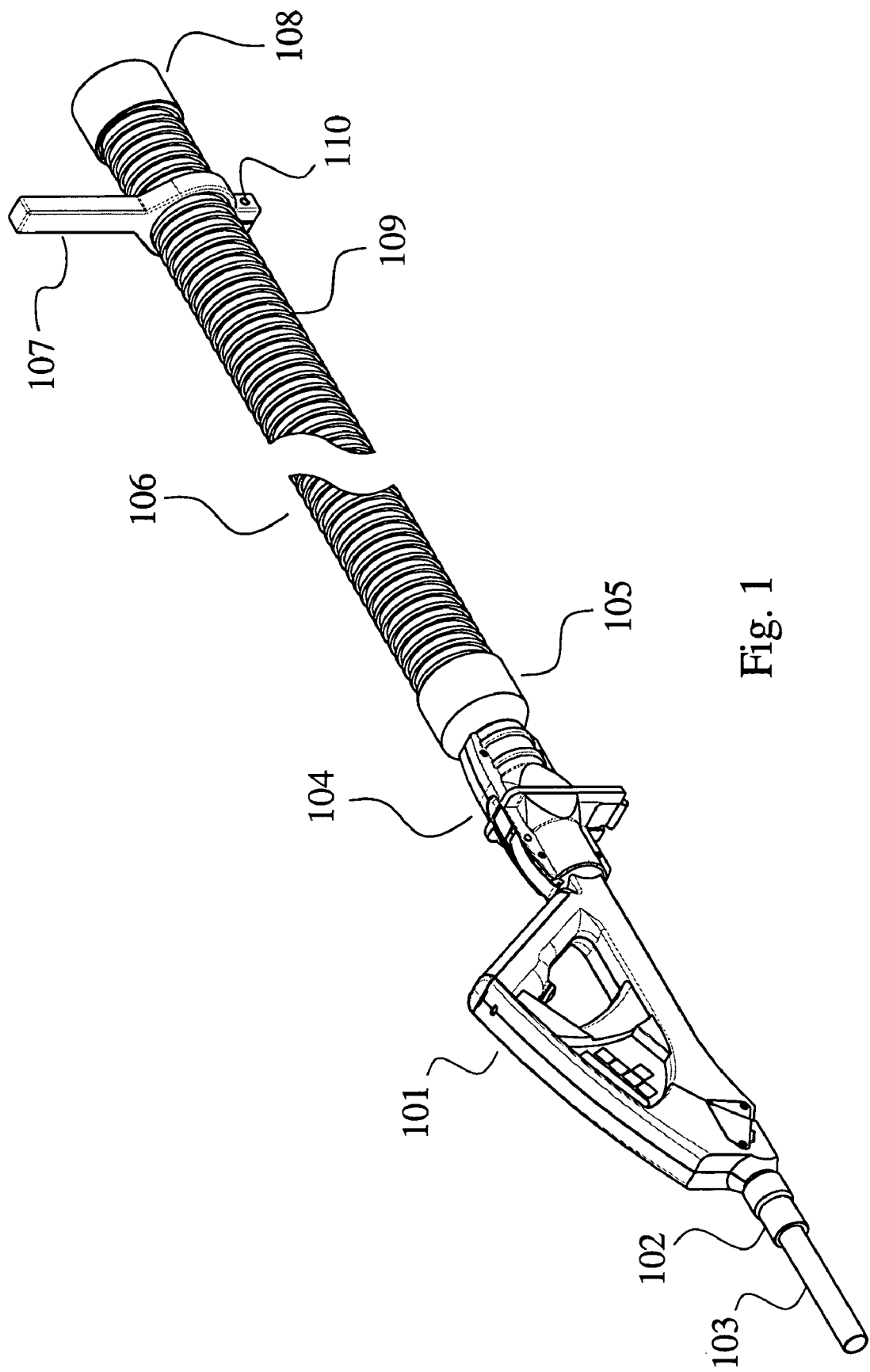
FIG. 1 is an isometric view in assembled form, of a preferred embodiment of a portable dispenser.

As shown in FIG. 1, a dispenser for dry particulate matter comprises a portable and hand held operating module 101 having an optional delivery-extension sleeve 102 and an extension tube 103. The operating module 101 is attachable to a flow-control module 104. The flow control module 104 connects via the adaptor 105 to a flexible storage tube 106. The storage tube 106 is terminated with an end cap 108. The flexible storage tube 106 also carries an optional and removable adjustable handle 107. As shown in this illustration, the flexible storage tube 106 preferably features spiral reinforcements 109 which serve to protect the tube against damage and which preferably fit the internal threading of the end cap 108 and adaptor 105.

Figure 24:
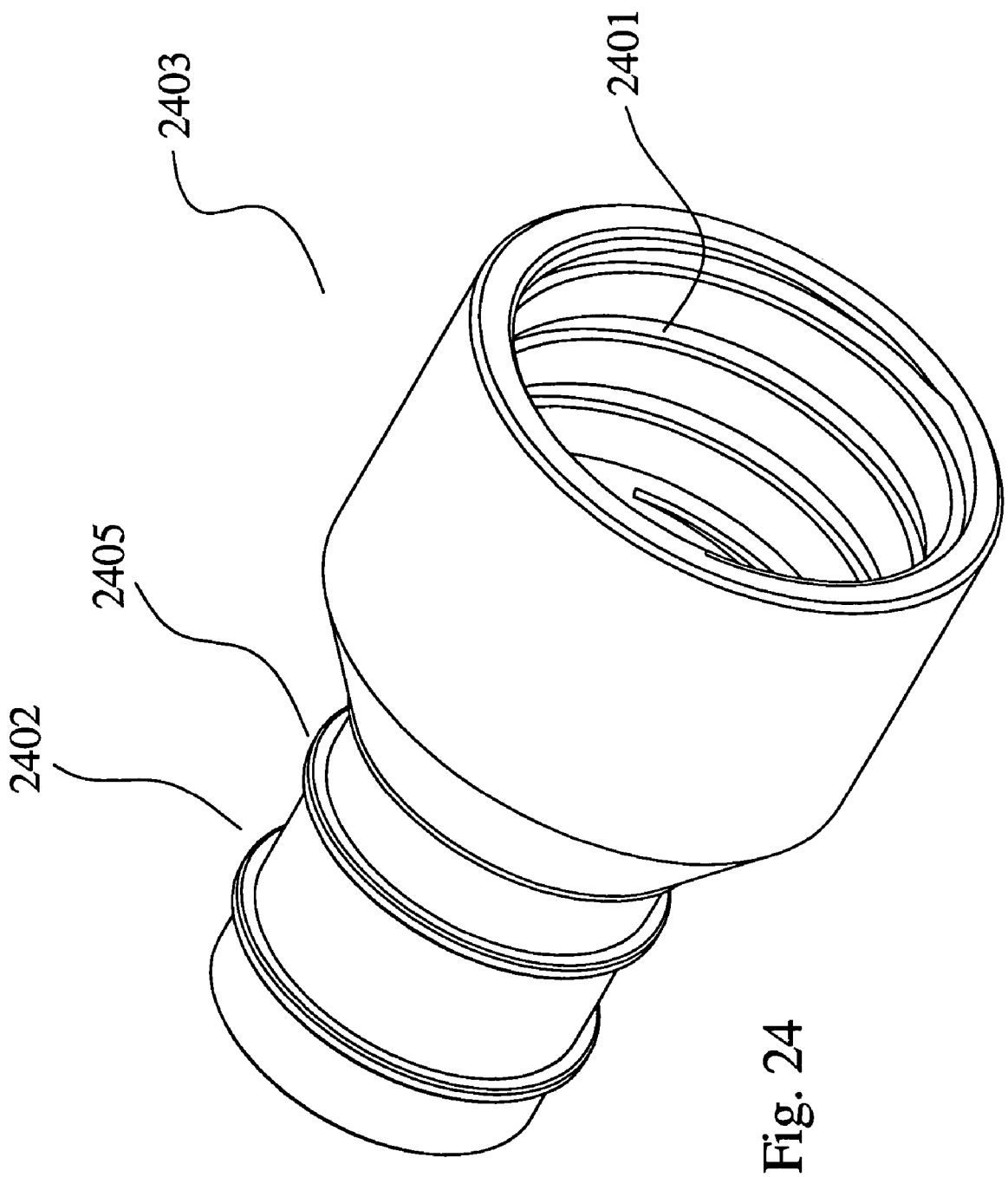
FIG. 24 is an isometric view of an adapter which connects the flow control module to the flexible storage tube.
Figure 26:
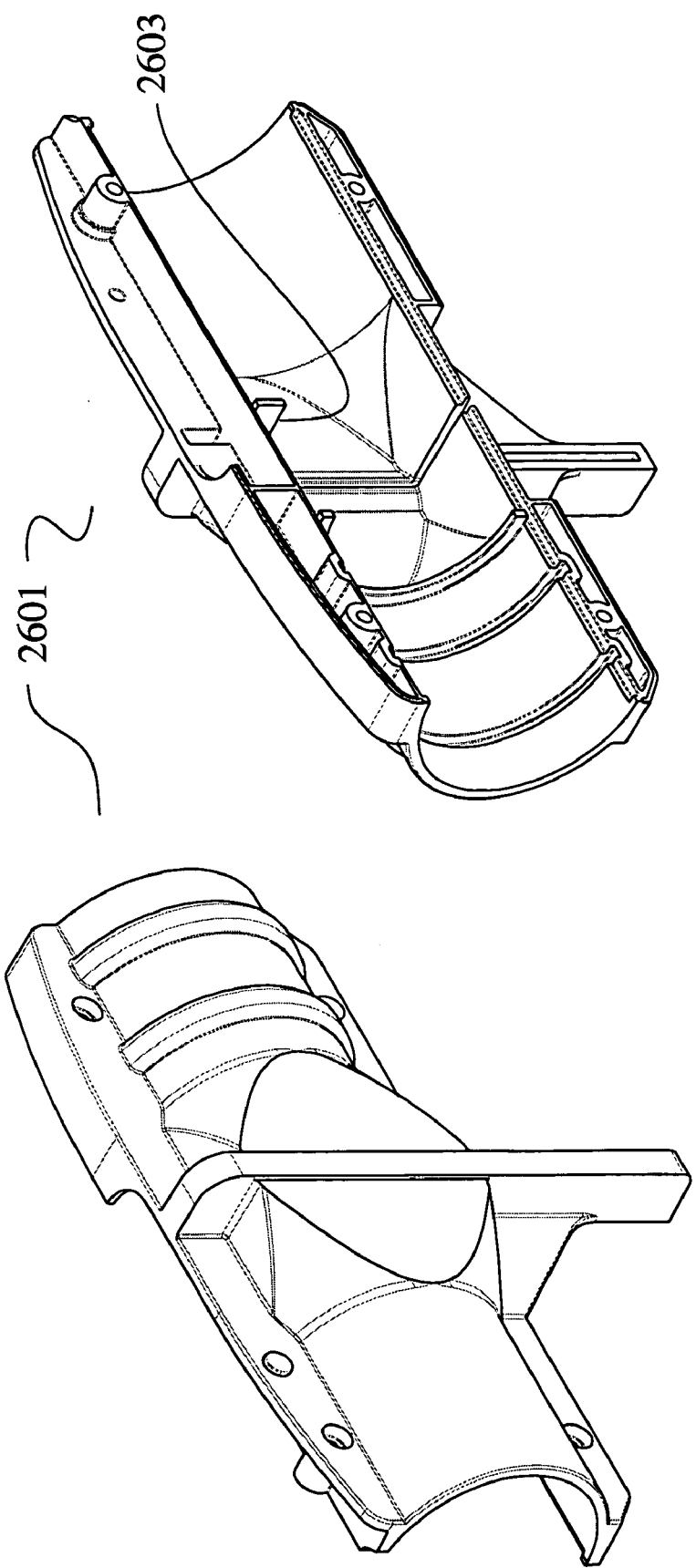
FIG. 26 shows two isometric views of a left-hand side of a flow control module.
Figure 28:
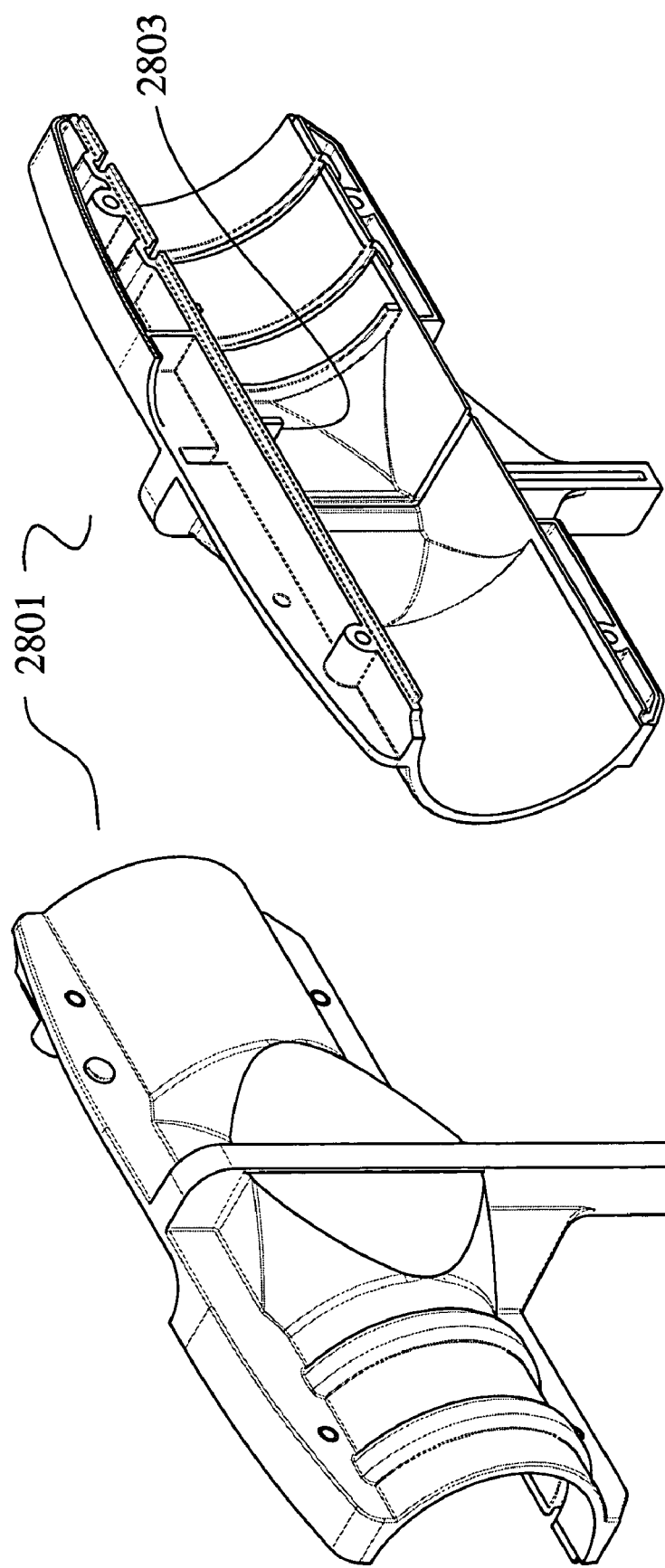
FIG. 28 illustrates, in perspective views, a right-hand side equivalent of FIG. 26.
Figure 29:
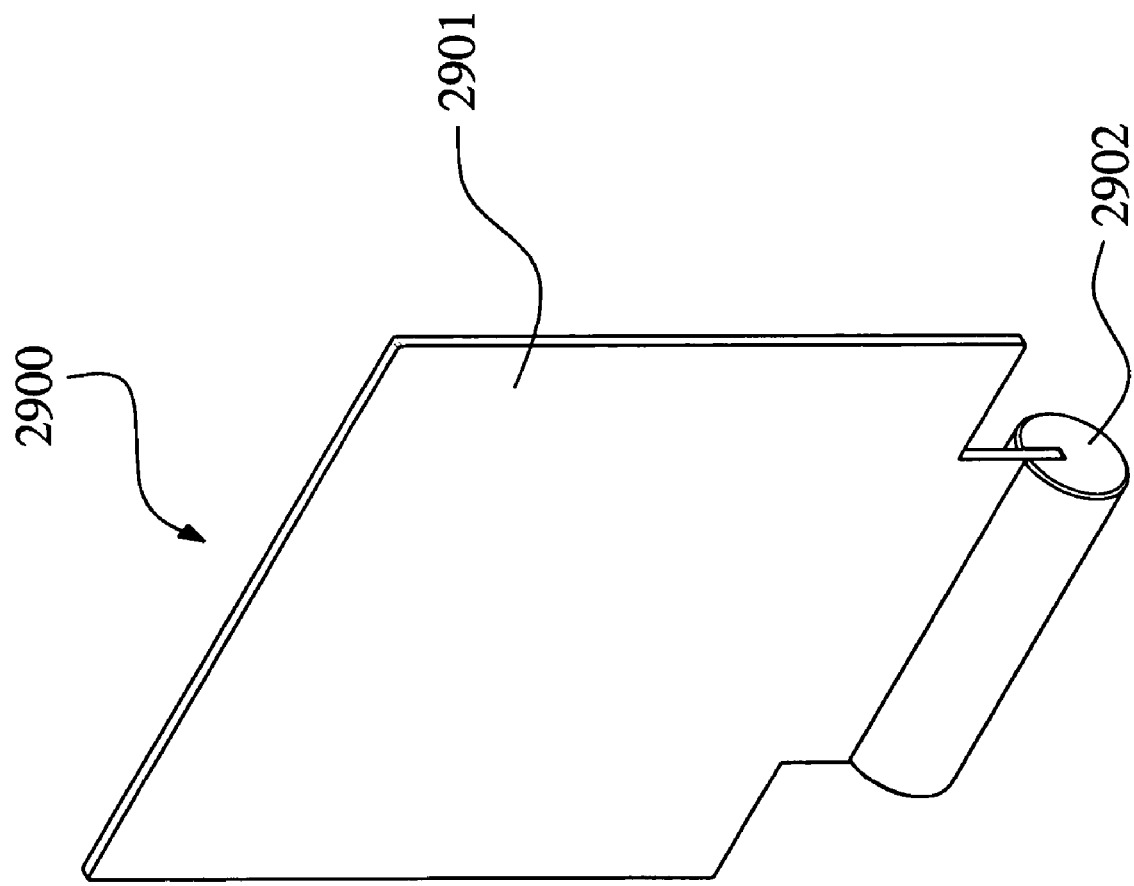
FIG. 29 is an isometric view of a flow control shutter and its components.

The end cap 108 is internally threaded to fit closely on the outside of the flexible storage tube 106, and is normally fixed in position by a removable set-screw. The handle 107 has a split ring that is tightened with a clamping screw 110 to adjust or tighten its orientation and hold on the flexible tube 106. The adapter 105 also has internal threads 2401 (see FIG. 24) matching that of the outside of the tube 106 to which it connects. As shown in FIG. 24, the interior of the downstream end 2402 of the adapter 105 is formed as a wide funnel such that granules will flow readily through it. The downstream end of the adapter 105, 2403 is preferably formed with external circumferential ribs 2405 matching and fitting into a like number of internal grooves 2303 in the flow control module 104, leaving the adapter 105 free to rotate fully in relation to the flow control module 104. Ability to rotate is desirable not only for operator convenience, but also to cater for the rotational effect (on the tube 106) of personnel switching between left- and right-hand use. The adapter 105 may be glued in position on the flexible tube 106.

Figure 2:
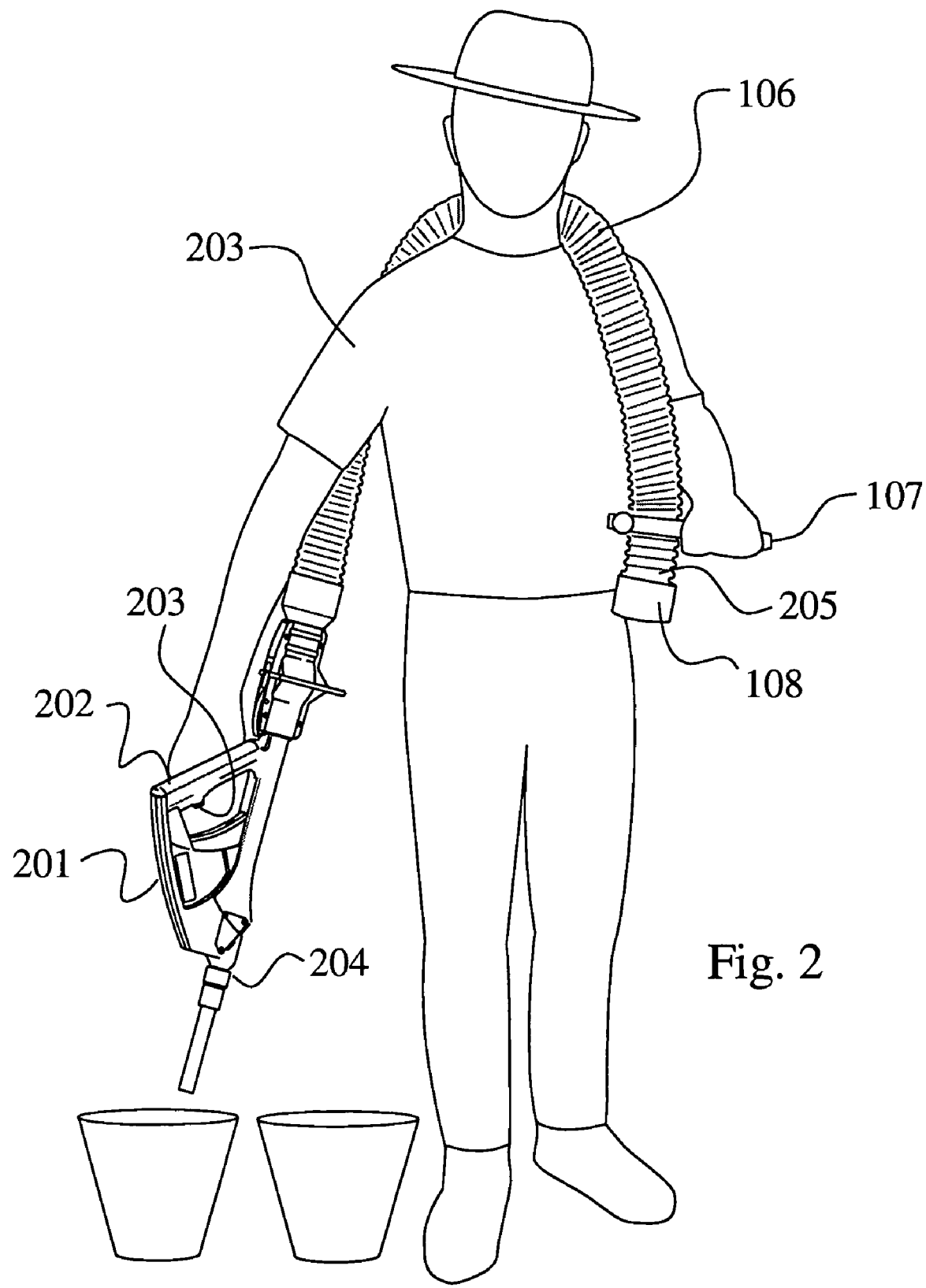
FIG. 2 is a graphic depiction of the manner in which a typical operator in the field holds and uses the assembly shown in FIG. 1.
Figure 30:
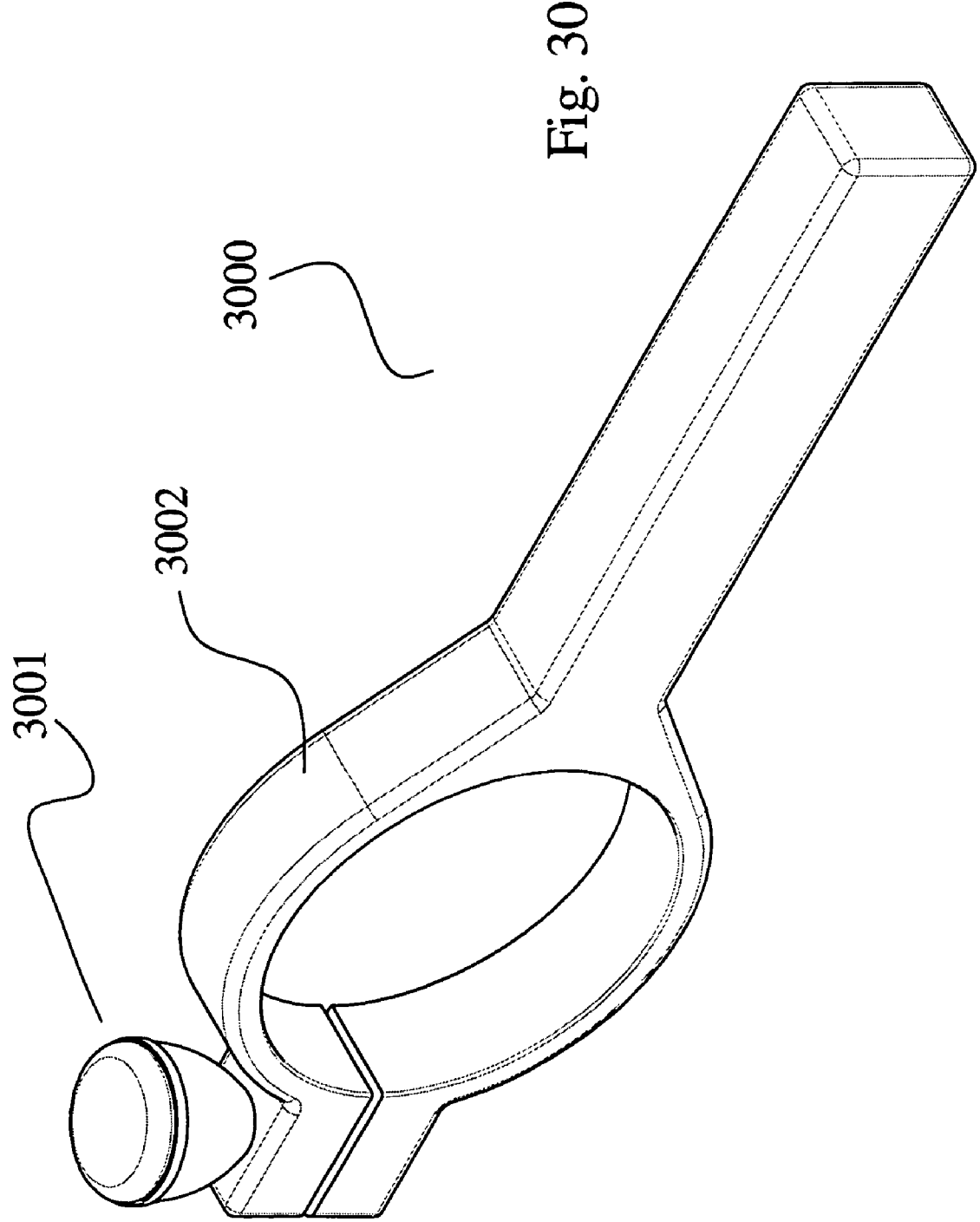
FIG. 30 is an isometric view of a handle 107.
Figure 31:
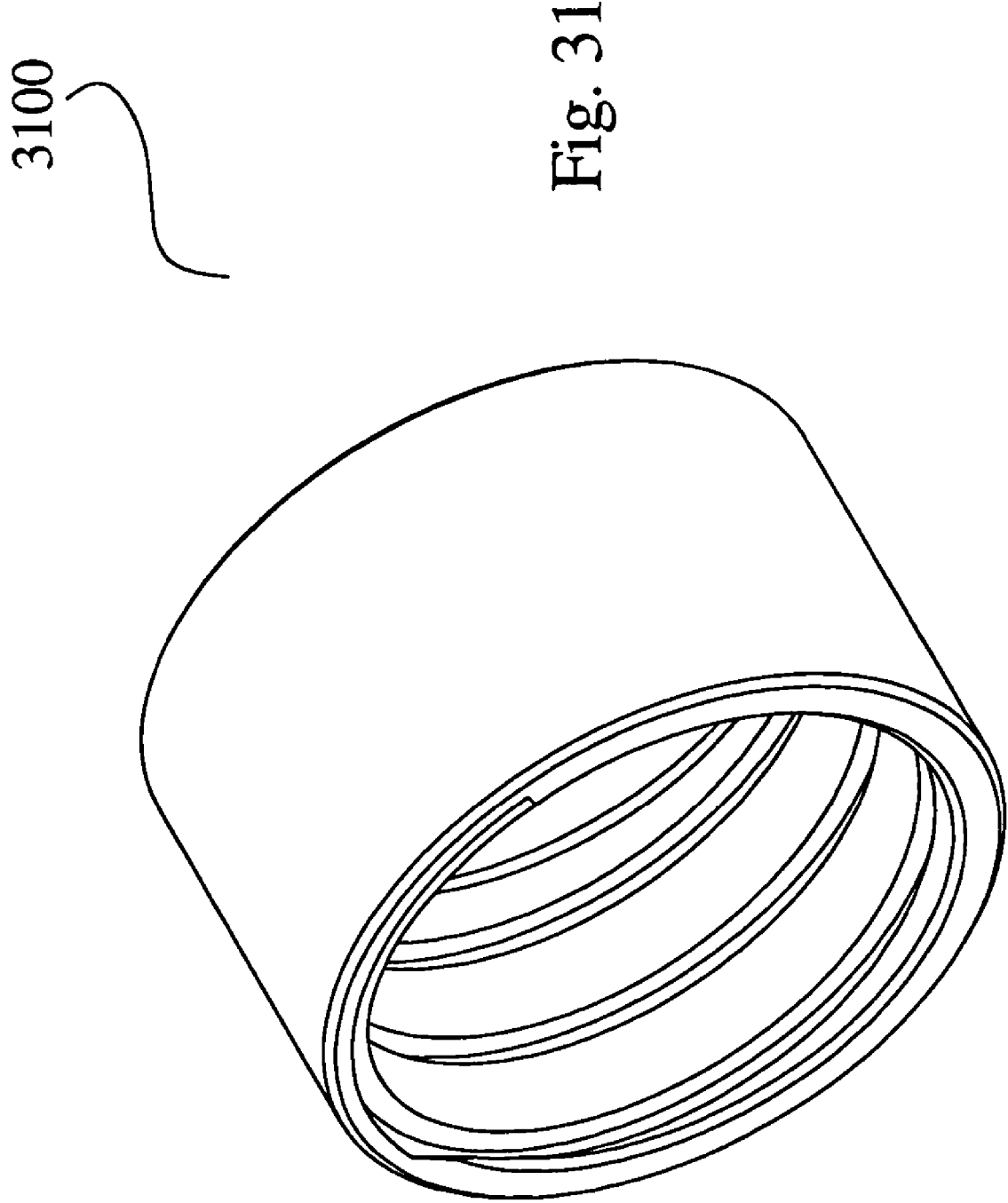
FIG. 31 is an isometric view of an end-cap for the flexible storage tube.

As shown in FIG. 2, the operating module 201 has a handle 202 that is gripped by the operator 203. The handle 202 has an electronic trigger 203 that can be depressed by the operator's index finger. As will be explained, depressing the trigger 203 causes the operating module 201 to dispense a pre-determined quantity of particulate matter through the delivery opening 204 and therefore into the appropriate extension sleeve 102 or extension tube 103, as required. The dry particulate matter that will ultimately be dispensed is stored within the flexible storage tube 106. As shown, the storage tube 106 is long enough, when held by the hand of an outstretched arm, to extend over the operator's shoulder whereby the distal end 205 is gripped and controlled from the adjustable handle 107 by the other hand, even when the other arm is also outstretched. The handle has a split ring 3002 and fastener 3001 (see FIG. 30) that allows it to rotate about the tube and be secured in fixed relationship to the tube. Note that there is no requirement for a backpack type storage reservoir and that neither the operating module nor the storage tube is strapped or harnessed to the operator's body.

Note that this ergonomically favorable layout results in substantial savings in both time and cost of field applications. Field trials indicate that over 20,000 pots per day per worker can be dosed with this type of apparatus. As will be explained, a digital display on the operator module alerts users to the dose setting, job count and state of the battery charge. The unit requires minimal operator training and facilitates compliance with occupational health and safety as well as environmental regulations. The dose quantity is fully variable from about 3 gr to about 50 gr per shot. When configured for use with fine grain materials, the dose range is typically from less than one quarter of a gram to up to 3 grams. As will be explained, the damage to prill coatings on controlled-release fertilizers is rare. The battery in the unit is intended to be recharged fully within four hours and yields over 30,000 shots on one overnight charging.

Figure 3:
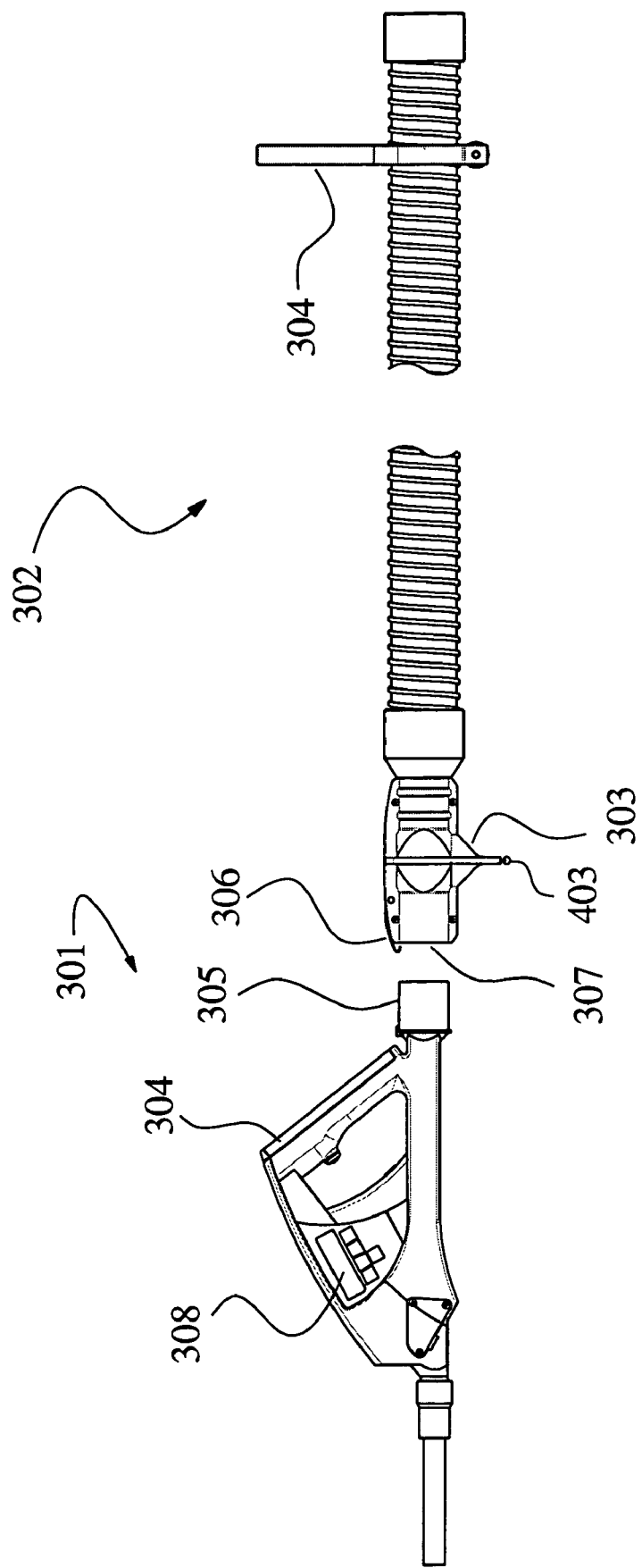
FIG. 3 is a side elevation of the components shown in FIG. 1 separated at the junction of the operating module and the flow control module.
Figure 4:
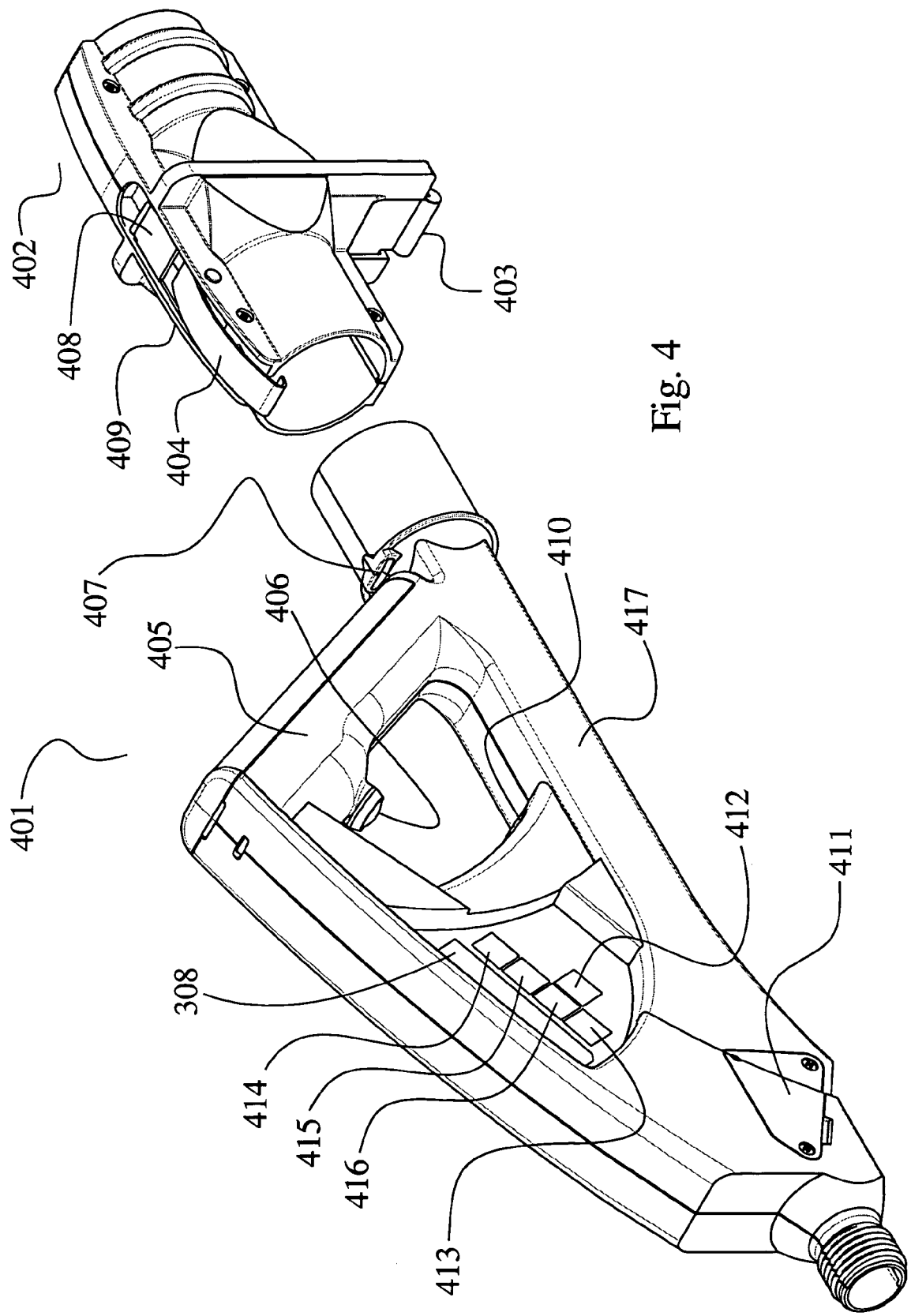
FIG. 4 is an isometric view of an operating module and the flow control module.

As shown in FIGS. 3 and 4 (for typical applications in the field), the user takes the storage assembly 302, opens the internal sliding shutter 403, and with the assistance of a funnel placed in the forward opening of the flow control module 307, fills the storage assembly 302 with the granular materials to be dispensed. The user then closes the shutter 403. Next, the user grasps the storage assembly 302 at two specific points. If right-handed, the right hand takes the flow control module 303, while the other hand takes the handle 304. Then with a simple swinging movement over the head, the storage assembly 302 is located as shown in FIG. 2 (but at this stage before attachment of the operating module assembly 301).

Next, the user takes the operating module assembly 301, inserts its upstream end 305 into the downstream end 307 of the storage assembly 302, and by means of the latch 306, 404 secures the two together. The user now grasps the handle 405 of the operating module 401 with the right hand while continuing to hold the handle 304 on the storage tube 106 with the left hand. The shutter 403 on the flow control module 402 is now opened, allowing granular particles to flow into the operating module 401, where they are stopped by a gate valve 1302 (see FIG. 13) in its closed position.

The user then presses a switch 412 to activate a program encoded in the microprocessor on a circuit board 712 (see FIG. 7), and when ready to dispense material presses the trigger 406 for each separate shot or dose.

An 8-character L.E.D display 308 provides information to the user on dose setting level, battery status and other items. Switch 412 is a toggle for On/Off to enable/disable operation of the unit. Switch 413 is the User-Menu selector. Switch 414 is marked "OK" for action on the current Menu selection shown in the display 308. Switches 415 and 416 are for adjustment of certain settings, (when shown in the display 308), 415 being to increase, 416 to decrease. When fully assembled, a flexible plastic printed film 706 is fixed in place over the display 308 and these switches with a clear window over the display and indicative printing over each switch. Another plastic printed film 707 containing product information is fixed to the opposite molding 708.

The storage tube 106 and storage assembly 302 as a whole are always under the complete control of the user even though they are not strapped to the body in any way. This adds to operator comfort, especially noticeable when distant plants must be accessed in which case it is only a matter of raising the handle 107 slightly and allowing the storage assembly 302 to follow the arm which is holding the operating module assembly 301 as it is extended away from the user's body. With such flexibility at all times the user is able to maintain the delivery tube 103 at a closely consistent slope, which is preferred for consistent dosage quantities. With this arrangement there is no tendency, as there is with back pack arrangements, to twist the body awkwardly to allow a tube connected to a back pack to follow attempts to reach distant plants.

Figure 6:
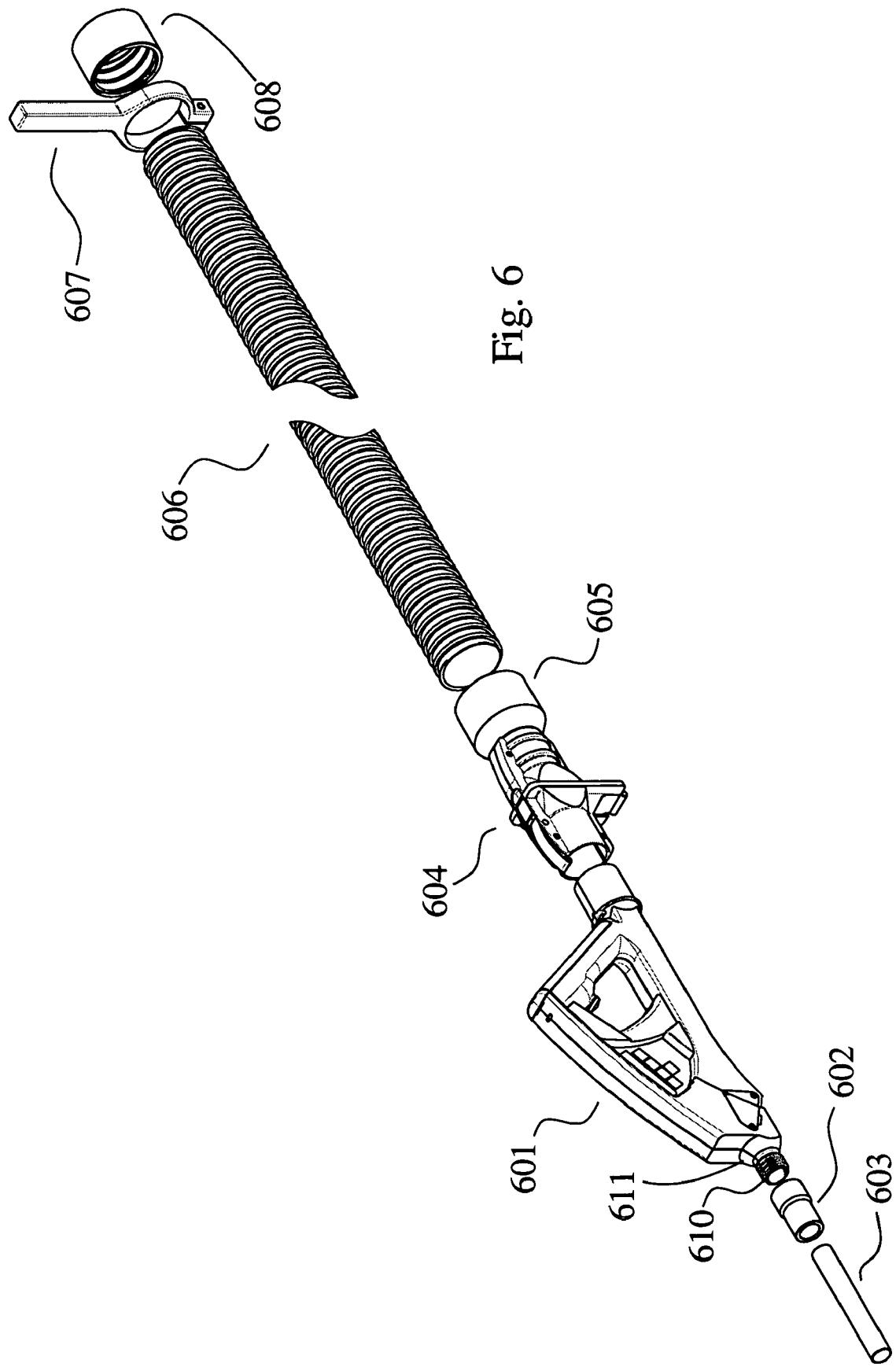
FIG. 6 is an isometric partially exploded view of components which are shown assembled in FIG. 1.

As shown in FIG. 6, the downstream end 611, 1602 of the operating module 101 receives a nozzle 1603, 610 which is threaded externally to receive the connector 602. While one end of the connector 602 has an internal thread to screw over the nozzle end 1603 of the operating module 101, its other end is formed internally for a very tight push-fit of two different types of standard tubing 103, 603 that users are likely to require as extension delivery nozzles.

In some manually-performed situations such as when fertilizing long rows of vegetables, an automatic recycling function programmed into the device's electronics is useful as it replaces the need to press the trigger 406 for each delivery of fertilizer. To activate this facility the user holds the trigger 406 in the depressed position. After a few seconds recycling commences, and continues until the trigger 406 is released. The time interval between each automatic triggering is regulated through the user Menu switch 413 and switches 414, 415 and 416 as will be explained. It is important to note that this recycling function is preferably not available through the unit's remote trigger socket 701 (see FIG. 7).

During automatic recycling, display of the user menu facility is preferably disabled. The reason for disablement is that the possibility of making changes to internal values such as Dose setting while the microprocessor may be using one of those values, has the potential for processing errors. The menu again becomes available immediately recycling is stopped.

When the supply of granular materials in the flexible storage assembly 302 is exhausted, the user closes the shutter 403 in the flow control module 402, releases the latch 404 on that module, removes the operating module 401 and places it aside, grasps the handle 304 on the storage tube 106 in one hand and the flow control module 303 in the other, then swings the empty storage assembly 302 forward over the head.

Figure 5:
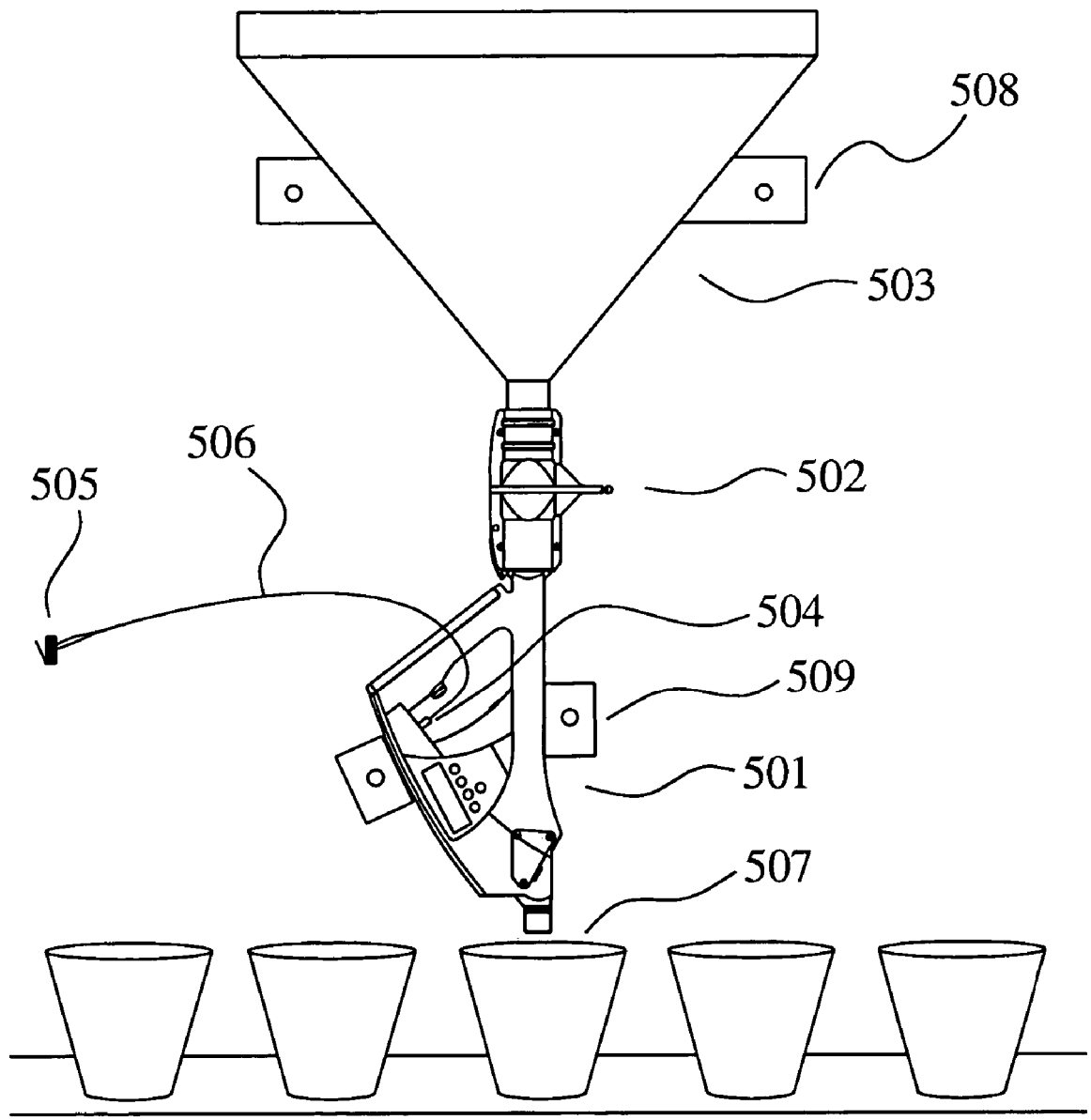
FIG. 5 is an isometric view of an operating module and flow-control module in use on a potting machine, showing a typical configuration beneath a storage hopper for the supply of particulate materials.

As indicated earlier, typical use on a potting machine is for application of small quantities of dry granular fertilizer to each container as it passes a given point on a conveying machine. FIG. 5 shows such an arrangement with an electric plug 504 inserted into the remote-trigger socket 701 on the operating module 501, with its control wires 506 terminating on a micro switch 505 nearby. In practice, the wire 506 may be very much longer so that this micro switch 505 or another form of actuator such as an optical sensor can be located elsewhere on the potting machine where it would be closed or opened (e.g., by a rotating cam, or in the case of optical activation, by the presence of a pot in a specific position) at the correct instant. Each closure of this remote switch 505 causes the triggering mechanism of the operating module 501 to be activated, delivering the pre-set quantity of fertilizer into each pot 507 at the appropriate instant.

When using the manual trigger 406, a repeat or recycling function is available. This facility is preferably not available through the remote trigger socket 701, for the reason that when this method of triggering is by other than manual means, it is likely that the triggering machinery (such as a cam actuating a micro switch) will sometimes be stopped with the trigger in the depressed position, which would otherwise cause triggering to continue.

As shown in FIG. 5, the operating module 501 is supported by a cradle 509 so that the flow control module 502 is vertically aligned with a storage hopper 503, generally supported by brackets 508. It will be appreciated that a device quite similar to the one depicted in FIG. 5 may be used in a mobile vehicle so that fertilizers or other granule materials can be delivered to the base of trees or other plants from a moving vehicle.

As suggested by FIGS. 23 to 29, the flow control module 104 comprises the two molded halves or pieces 2601 and 2801 plus the sliding shutter 2307 for flow control, plus the pin 2304 for retaining the draw latch 2305, all being assembled simultaneously with the adapter 2403 and held together with the screws 2306.

The two pieces of the shutter 2901 and 2902 are, for example, made of highly-durable plastics and are glued together.

FIGS. 25 & 27 show the guide grooves 2502 and 2702 which retain the flow control shutter 2307 in position at right-angles to the flow axis of the flow control module 402. Blind ends on such grooves could result in the accumulation of grit, so they are made open-ended, with the travel of the shutter 2900 continuing on against the internal stop 2503, 2603, 2703, 2803.

Figure 7:
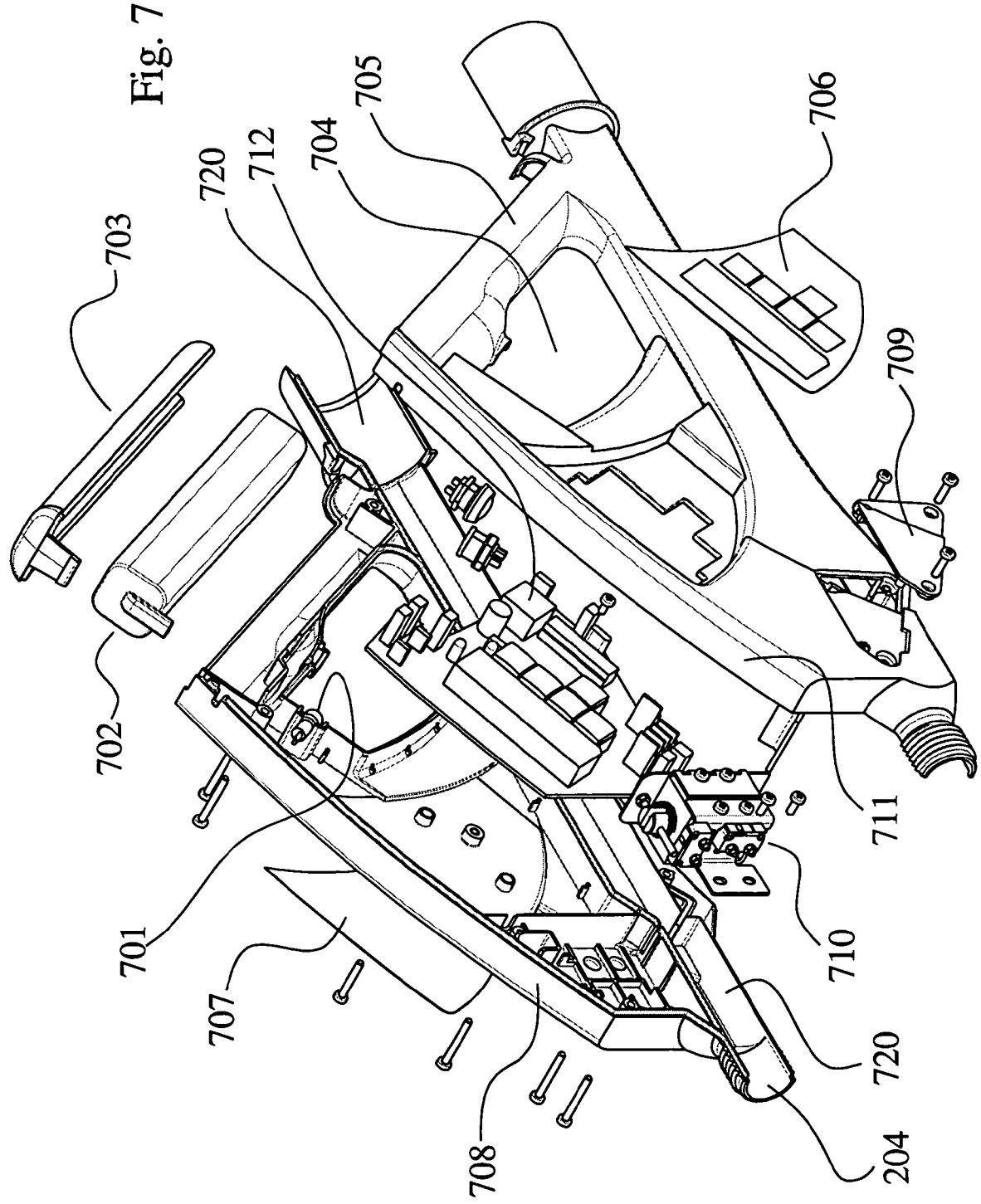
FIG. 7 is an isometric exploded view of an operating module and its components.

With reference to FIGS. 3, 4 and 7, the downstream end 307 of the flow control module 303 is fitted over the upstream end 305 of the operating module 301, the latch 404 is closed over the recess 407 on the operating module 401, then the lever 408 on the latch 404 is snapped into position flat along the body 409 of the flow control module 402. On the operating module 401, the battery 702 (see FIG. 7) is housed in the handle 405 and is secured in position by the battery cover 703. The manually-operated trigger 406 is located on the handle 405. At the upper end of the finger-recess 704 forward of the handle 705 a socket 701 is located for the purpose of receiving a plug for remote triggering when required. Forward of the handle 405 is a socket 410 for attachment of an external 24-volt direct-current power supply as required for battery recharging. FIGS. 4 and 7 also show the inspection cover 411 and 709 providing limited access to the solenoid gate valve 1302 for maintenance.

Figure 8:
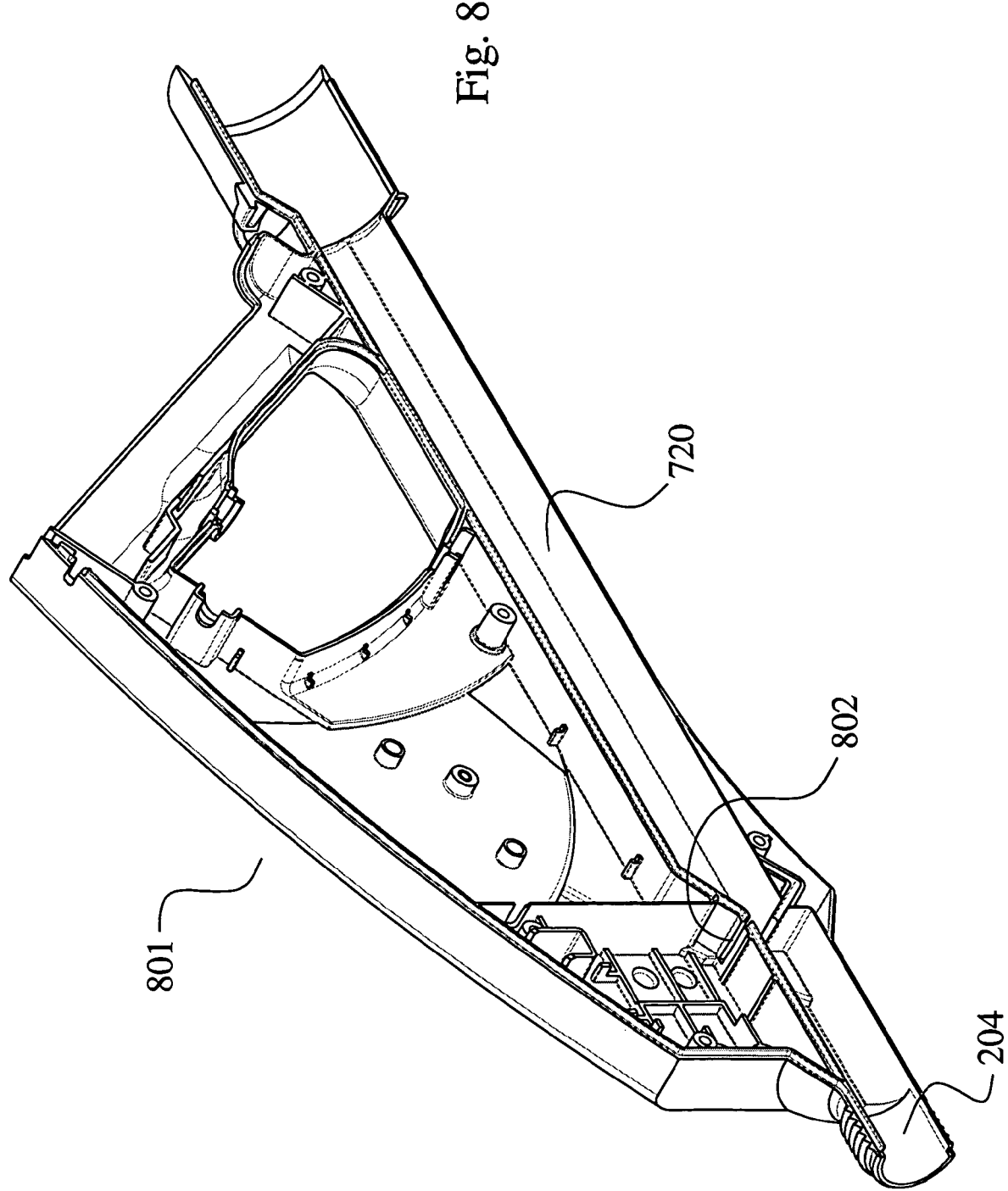
FIG. 8 is an isometric view of the interior of the right-hand side molding of the operating module.
Figure 9:
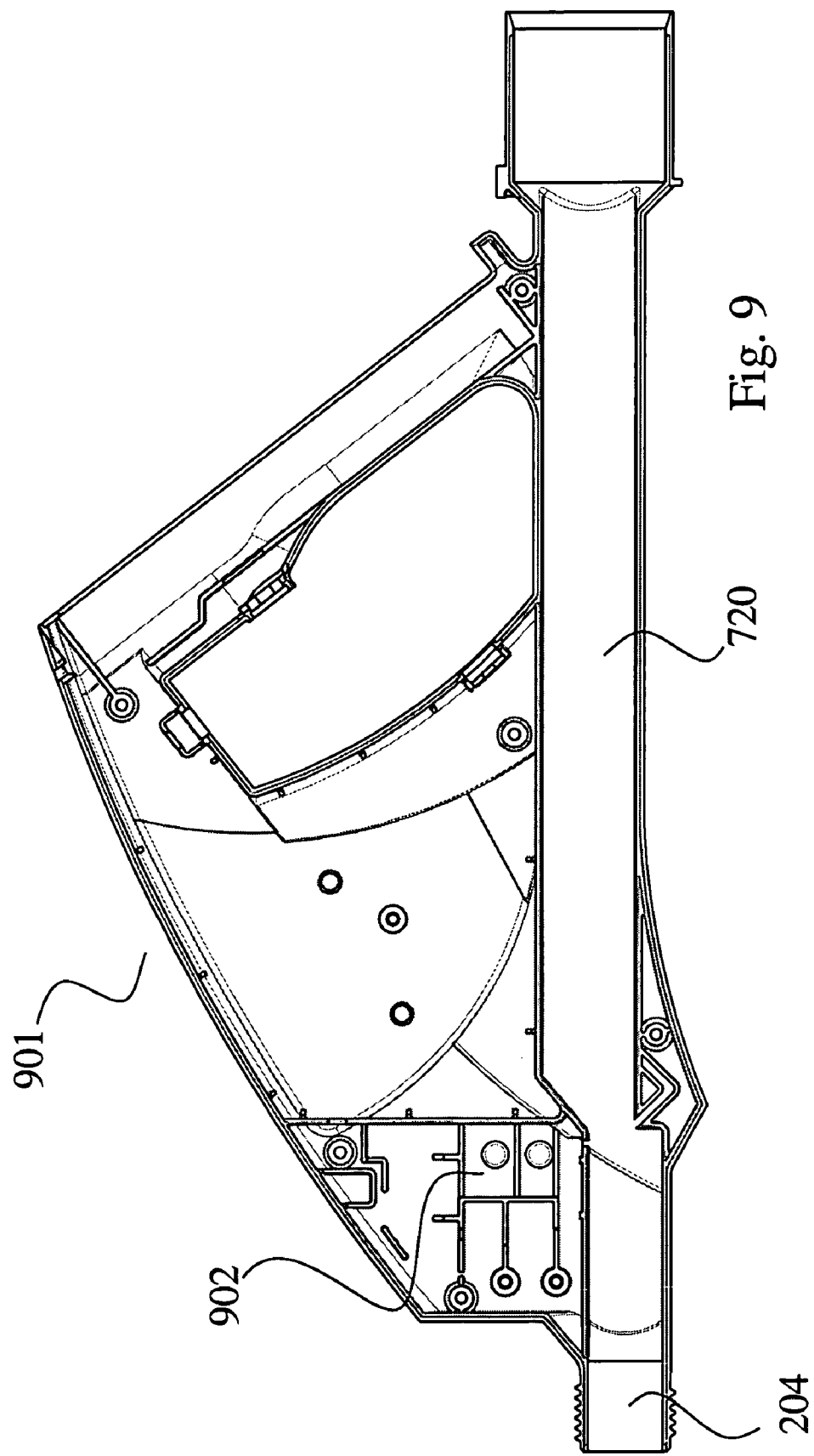
FIG. 9 is an elevation of the interior of the right-hand side molding of the operating module showing outlines of the molding shapes required for retention of the solenoid assembly shown in FIG. 12.

As suggested by FIGS. 7, 8 and 9, one of the main purposes of the operating module is to contain an internal flow path 720 and a solenoid assembly 710 that is able to regulate the flow of dry particulate matter through the flow path 720. In respect of the present example, the flow path is generally straight and cylindrical both upstream and downstream of the solenoid assembly and its gate valve 1302. The precise configuration of the flow path in the area of the gate valve 1302 is better explained with reference to FIG. 13. The internal flow path 720 extends through the entire length of the operating module 101 and terminates at the delivery opening 204.

Figure 12:
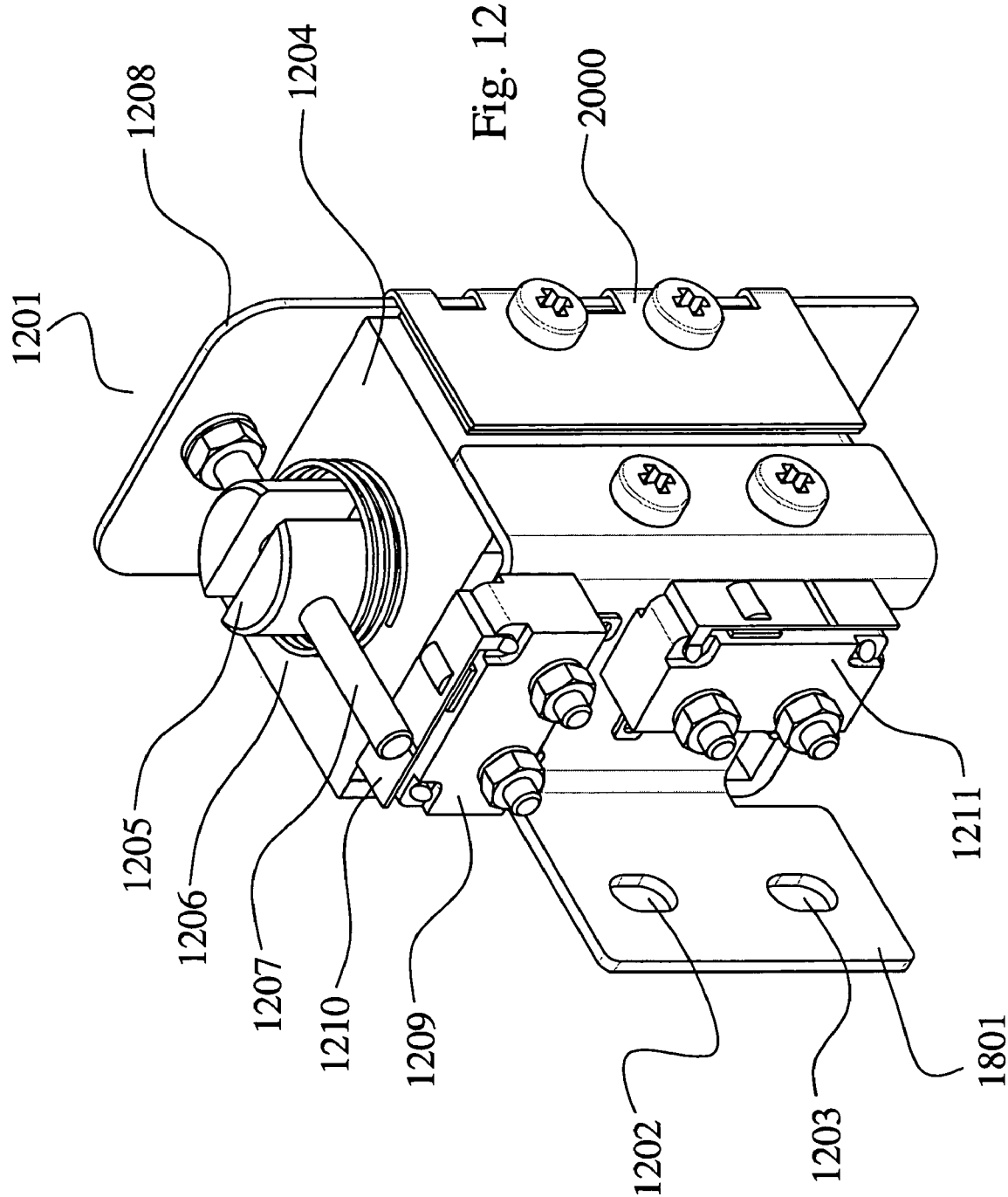
FIG. 12 is an isometric view of a solenoid assembly with gate valve for general use in the closed position.

As shown in FIGS. 7 and 12, a solenoid assembly 710 (shown in more detail as 1201) is fixed within the two halves 901 and 1500 of the operating module 101 to control and regulate the flow of granular materials. Micro switch 1209 is a position-sensor and wires are connected from it to the unit's electronic circuit board. When the solenoid plunger 1205 is in the closed position the pin 1207 keeps the lever 1210 on the switch 1209 in the depressed (open circuit) position and vice versa. A second micro switch 1211 is a safety-switch connected to the circuit board in series with the coil of the solenoid 1204. When the inspection plate 709 is removed this switch 1211, 1704 is open, so the solenoid 1204 cannot then operate. The inspection plate 709 allows access to the flow path in the area of the gate through the side cover.

Figure 15:
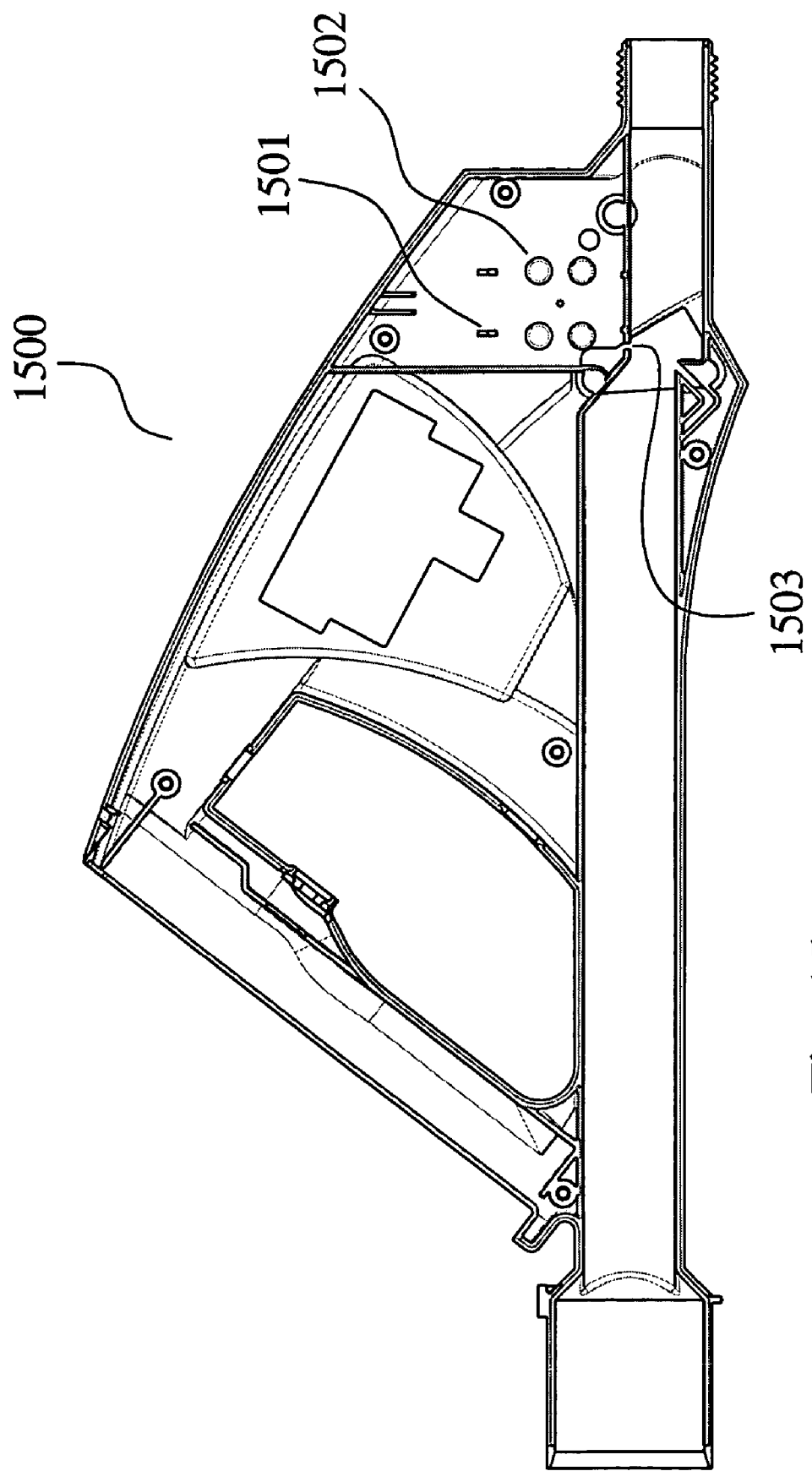
FIG. 15 is a side elevation of the interior of the left-hand molding of an operating module, showing outlines of the molding shapes necessary for fitment and retention of the solenoid assembly, its gate, and the gap controller.
Figure 16:
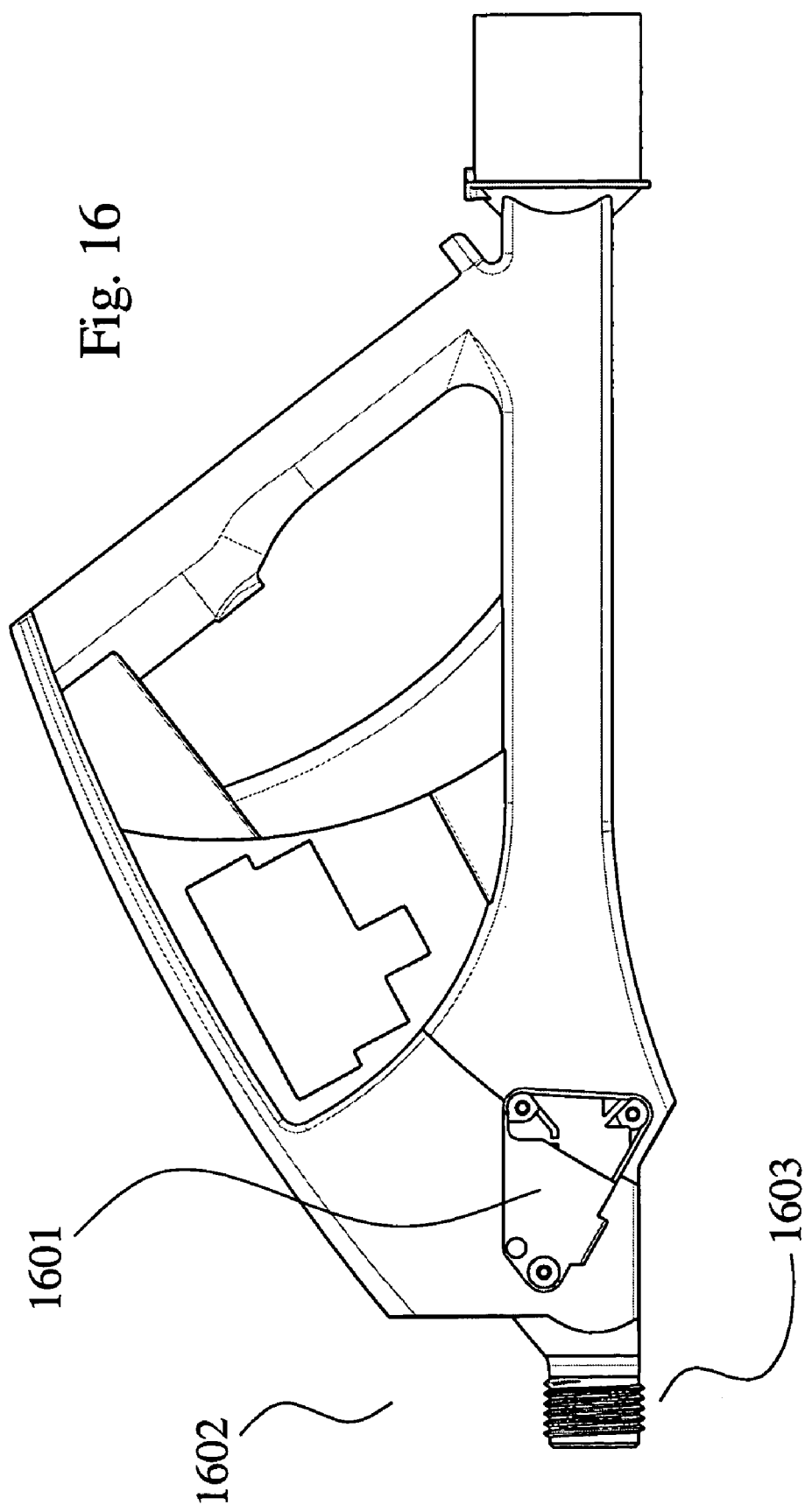
FIG. 16 is a side elevation of the exterior of the left-hand molding of an operating module with the opening available to users for maintenance.

With further reference to FIGS. 10 and 15, the position of the solenoid assembly 710, 1201 in the operating module's housing molding 1000 is fixed precisely by means of raised lugs 1001 and 1002, a pattern of raised bars 1003 and recesses 1004 and 1005, such that the gate valve 1302, 1707, 3201, 3301 fits very closely through the slot 1006, 802 in the flow path 1020 of molding 1000, 801. The other half molding 1500 has a corresponding but not identical pattern of lugs 1501 and recesses 1502 and slot 1503 which fit with the opposite side of the solenoid assembly 710, 1201 when all parts are fitted together. The solenoid assembly 710, 1201 is secured in place in molding 1000 by retaining screws through the holes 1202 and 1203 (the bracket 1801) and into the bosses 1008 and 1009 located in the molding 1000, as shown in FIG. 13.

Figure 13:
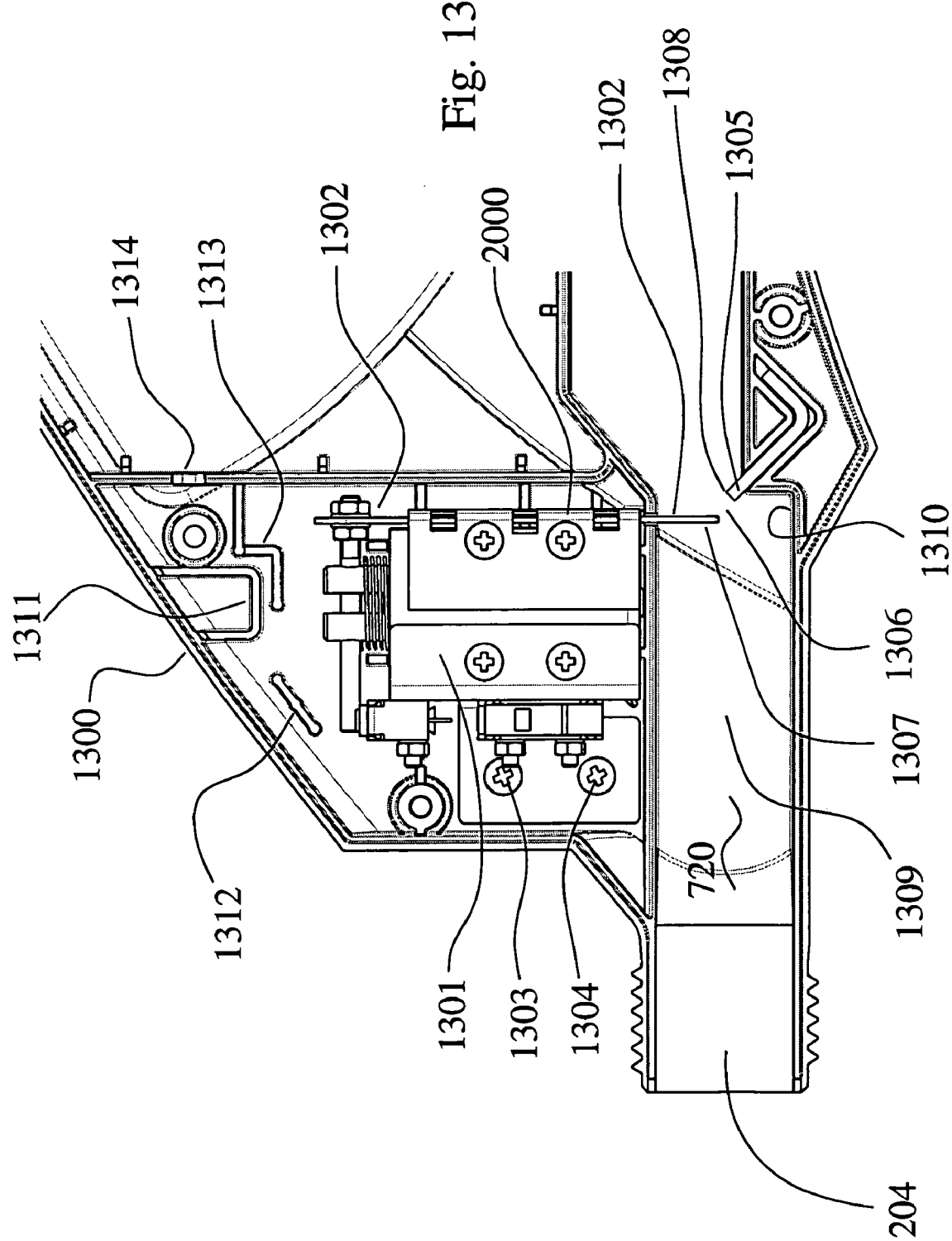
FIG. 13 is an elevation of part of the interior of the right-hand molding of the operating module with the solenoid assembly installed in it and with the solenoid gate for general use in the closed position.

FIG. 13 shows the solenoid assembly 1301 secured in place in the molding 1300 and retained by screws 1303 and 1304. Here the solenoid driven gate valve 1208, 1302 is in the closed position, this gate valve 1302 being the gate used when the unit is configured for use with other than fine-grained materials. The flat gate valve is retained and guided by an "L" shaped bracket 2000.

Figure 17:
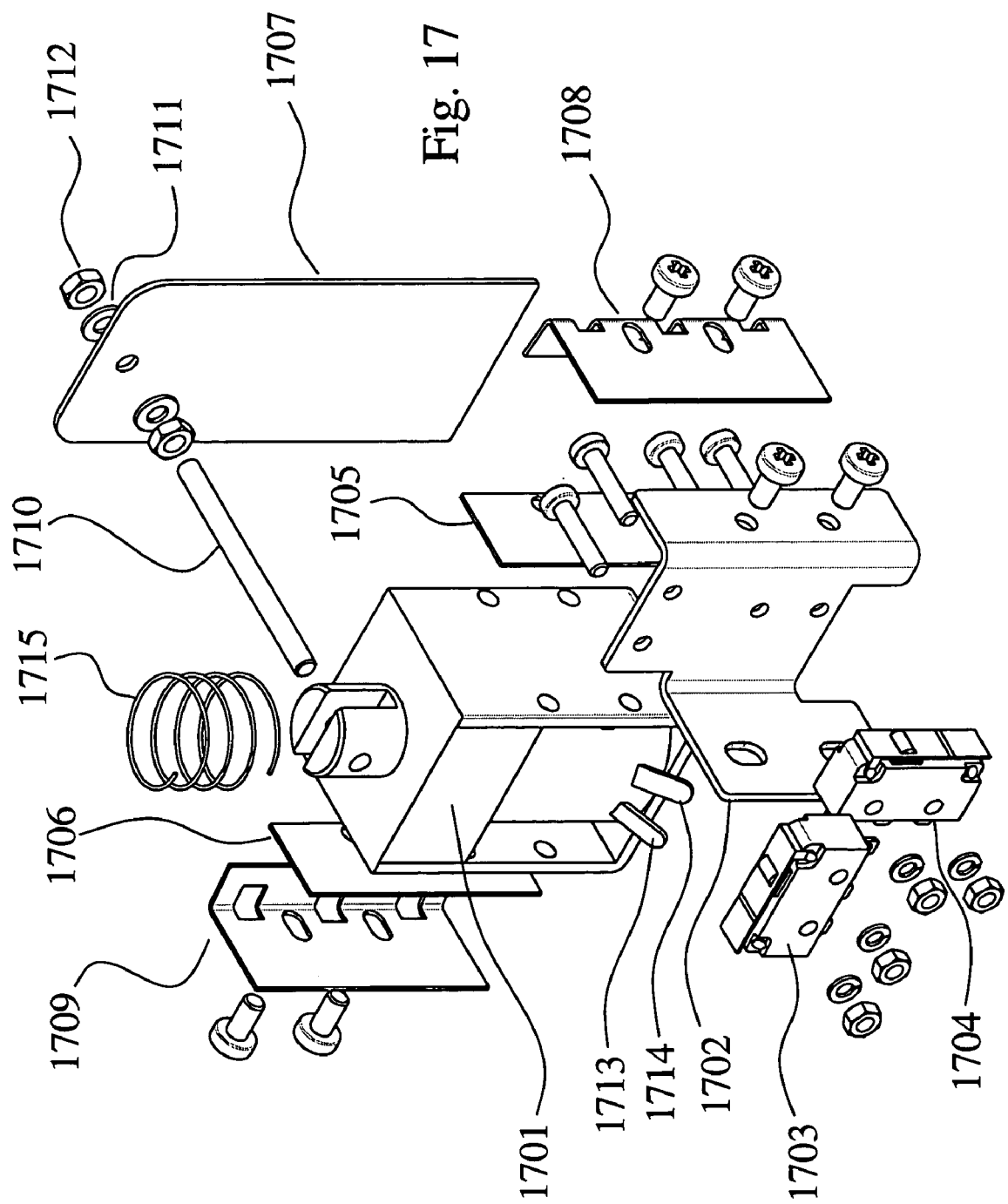
FIG. 17 is an isometric exploded view of the solenoid assembly and its components, including the gate which is replaced by another gate when the unit is configured for fine-grained materials.
Figure 20:
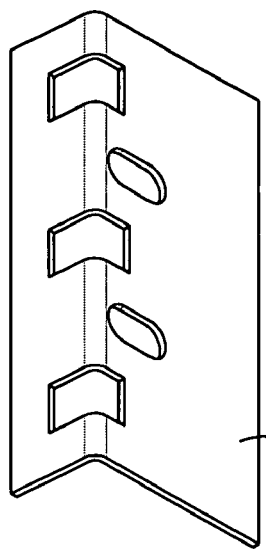
FIG. 20 is an isometric view of one of the two retaining brackets that are bolted to the solenoid and which together form the sliding-space available for the gate.
Figure 22:
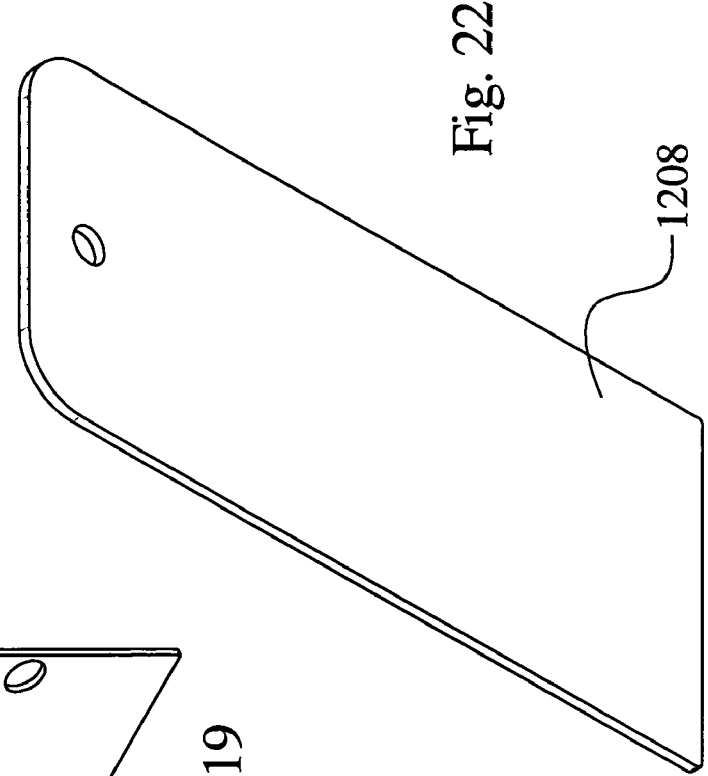
FIG. 22 is an isometric view of a solenoid gate.
Figure 19:
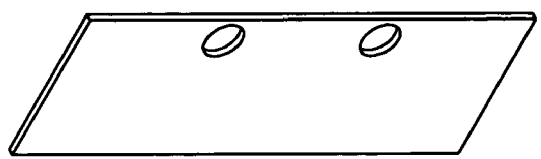
FIG. 19 is an isometric view of one of two spacers used to set the sliding-space available for the gate.
Figure 21:
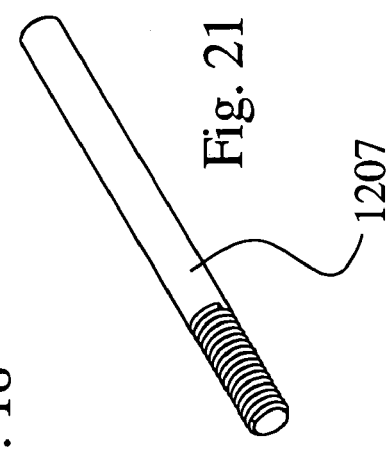
FIG. 21 is an isometric view of a solenoid gate pin.
Figure 18:
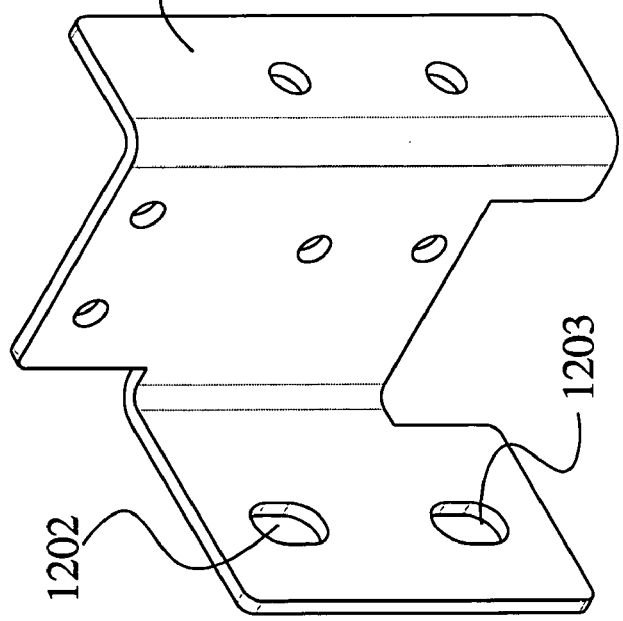
FIG. 18 is an isometric view of a solenoid mounting bracket which secures the solenoid to the molding and supports the micro switches.
Figure 23:
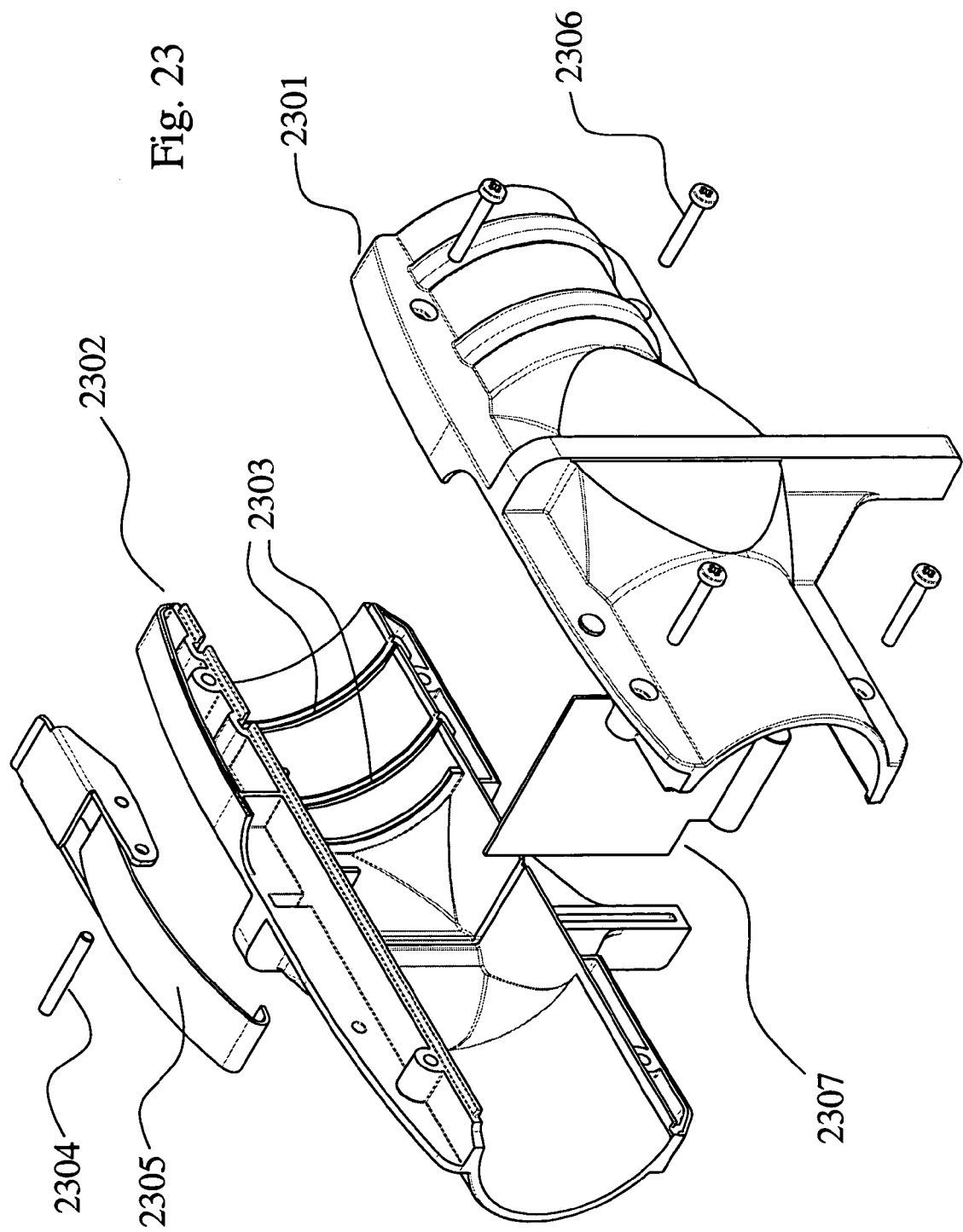
FIG. 23 is an isometric exploded view of a flow control module.

FIG. 13 also shows two raised low walls 1312 and 1313 which are to facilitate the secure routing and fixing of electric wires from the solenoid assembly 1201 through the cutout 1314 to the circuit board 712, these walls 1312 & 1313 and therefore the wires themselves being clear of the solenoid plunger 1404 when it is in the open position. (In FIG. 17, the two tabs 1713 & 1714 are the points at which electrical connections are made to the coil of the solenoid 1204.)

In FIG. 13 the "L" shaped metal gap controller 1305, 1100 has been placed in its "L" shaped slot 1010 leaving a gap 1306 between the gate valve 1302 and the gap controller 1305. The gap controller 1305 fixes the size of the gap 1306 to a specification related to the size of the granular particles to be dispensed.

Figure 14:
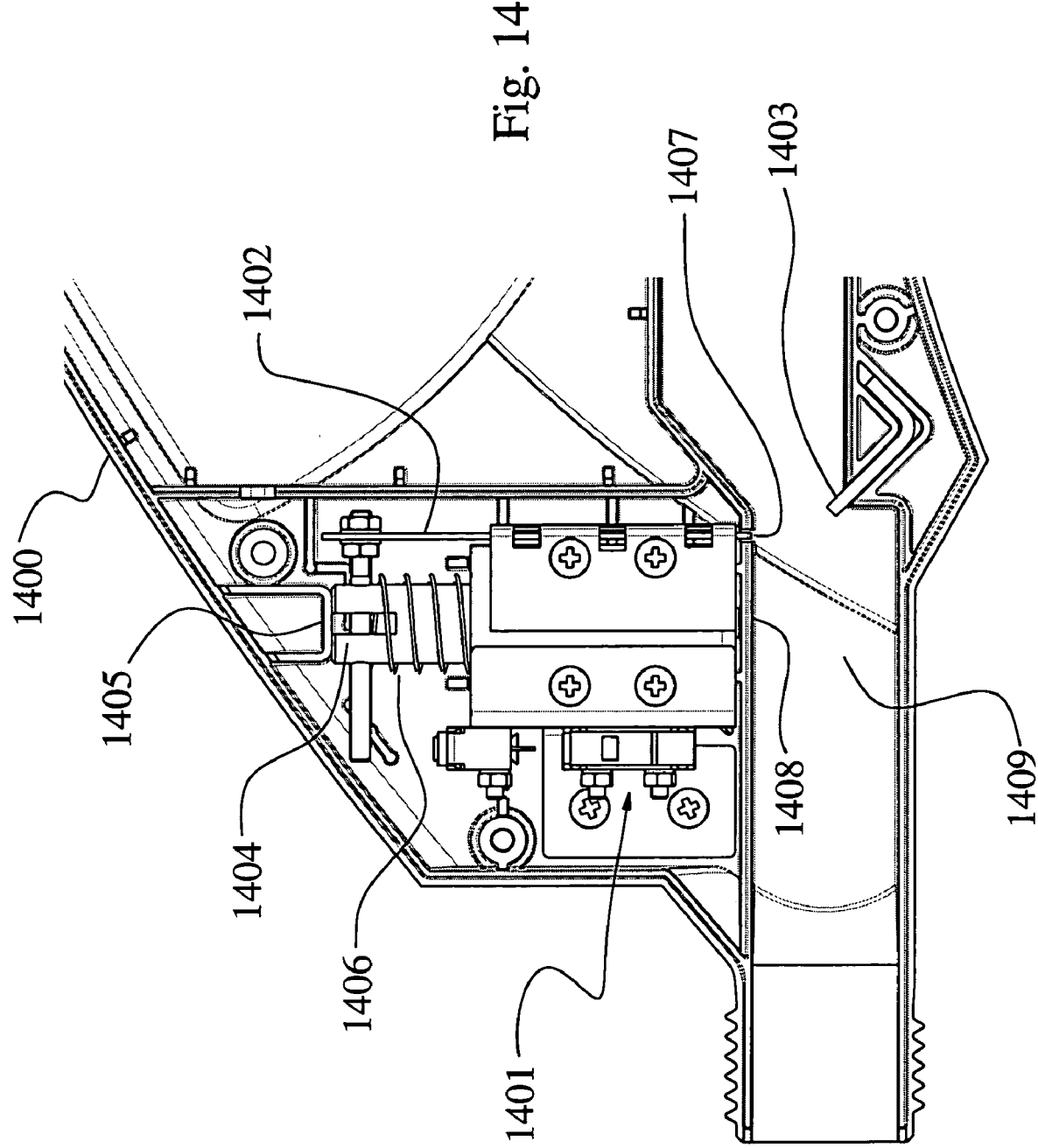
FIG. 14 is an elevation of part of the interior of a right-hand molding of the operating module with the solenoid assembly installed in it, with the solenoid gate in the open position, and with the gap control metalwork also installed.

FIG. 14 shows the gate valve 1402 in the open position, being tied to the solenoid plunger 1404 which here is in its open position pressed against its stop 1405 by the spring 1406, 1715. The travel of the plunger 1404 of the solenoid assembly 1401 is such that when the plunger 1404 is in the fully open position up against the stop 1405, the lower end of the gate valve 1402 is still in its slot 1407 but is flush with the interior ceiling 1408 of the flow channel 1409 at that point.

When applying granular materials, particles are generally of such a size and solidity that even though they are directly in contact with the gate valve 1302 and adjacent to the slot 1407, the slot 1407 is so small in relation to their particle size, that jamming is normally prevented. But when using fine-grained materials, jamming is much more likely with that configuration, so a specialized arrangement is provided, as follows.

Figure 32:
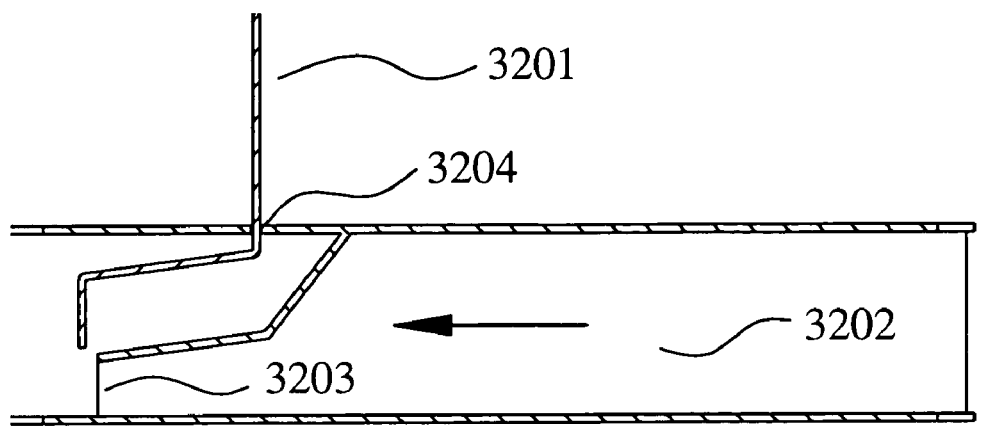
FIG. 32 is a cross sectioned elevation of a modified channel and modified gate (in the open position) for use when the present embodiment is to be configured for the application of fine-grained and powdered materials.
Figure 33:
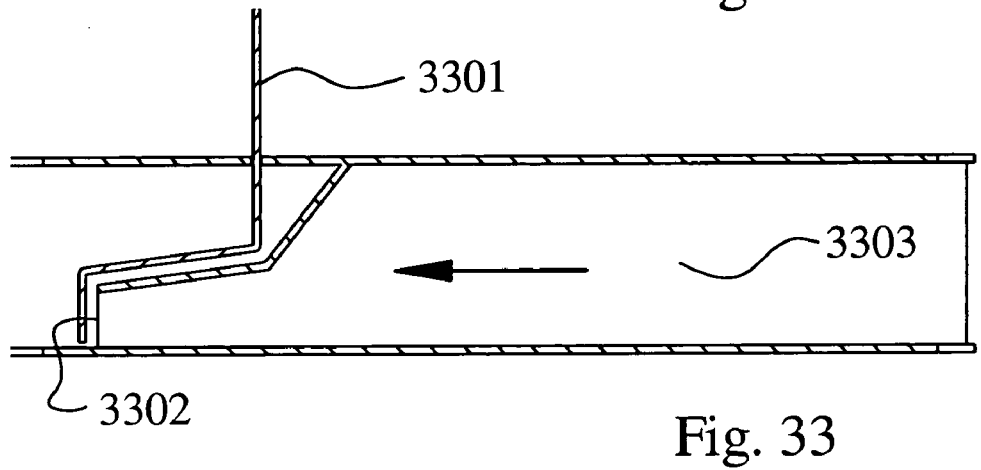
FIG. 33 is a cross-sectioned elevation of a modified channel and modified gate in the closed position, for use when the present embodiment of the applicator unit is to be configured for the application of fine-grained and powdered materials.
Figure 34:
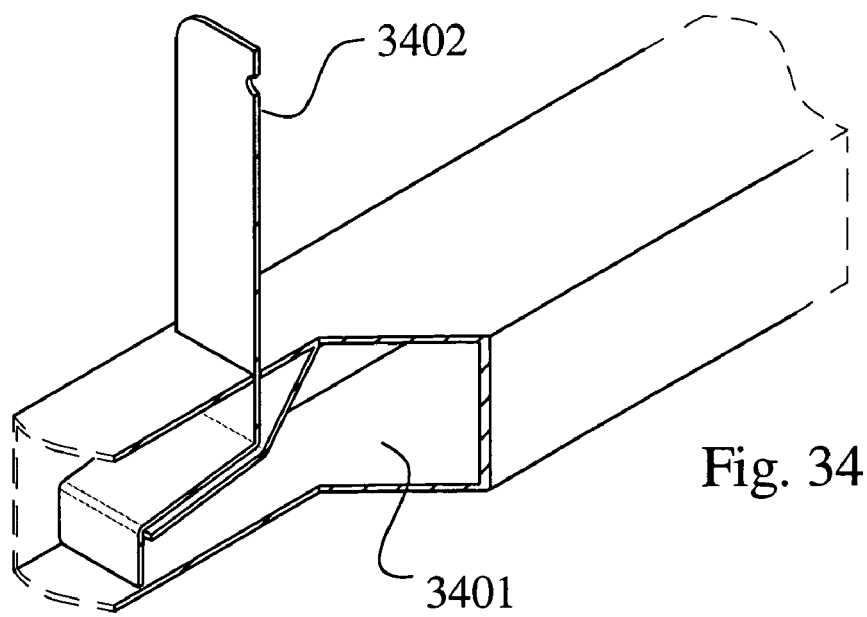
FIG. 34 is an isometric partially cut-away drawing of the modified channel, showing part of the gate in the closed position.

With reference to FIGS. 32 to 34, to avoid direct contact between fine-grained material and the gate's slot 1407, and thus aim to prevent the possibility of jamming of the mechanism, the flow channel 1409 is altered so that the discharge point 3203 at which the material emerges from the channel 3202 is further downstream of the slot 1407, 3204 preferably by at least 20 millimeters (⅘th inch) in the axial direction, which effectively isolates it from the slot 1407, 3204 by at least 25 mm (one inch) as shown in FIGS. 32 and 33. Note that the channel tapers down to the discharge point 3203.

Therefore the shut-off valve 3201, 3301 performs its control function correspondingly further downstream of the slot 3204, yet is controlled through that same slot 3204, requiring a "Z" shaped gate valve 3201, 3301, 3402 as shown. As the material always moves along the channel 3202 by gravity alone and the channel 3202 is normally close to vertical, by this arrangement jamming due to entry of fine particles into slot 3204 becomes much less likely. As in all configurations of the present embodiment, the user in any event is able to access this area if necessary.

As in the case of FIG. 13 where the gate 1302 leaves a gap 1306 even when in the closed position, FIG. 33 shows that with this configuration for fine-grained materials, when the gate 3301 is closed there is still an axial gap 3302 between the discharge point 3203 (where material emerges from the tapered channel 3202) and the gate valve 3201, 3301 itself. The size of this gap 3302 for materials having particle diameters of less than one millimeter is typically 1.5 millimeters. When the gate valve 3201/3301 moves to the closed position, the "bridging effect" prevents further flow of material, and when the gate 3301/3201 is again opened, the flow of material re-commences.

The solenoid activated reciprocating gate valve 1302 of the operating module 101 is arranged as shown in FIG. 13 such that when the gate 1302 is in the closed position, it is not fully closed against any solid object or floor. Instead, when it is in the closed position (FIG. 13) its leading edge 1307 is positioned downstream of the downstream edge 1308 of the gap controller 1305, and with a gap 1306 between the two.

When the gate valve 1302 is closed there is a narrow linear gap between its leading edge 1307 and the downstream leading edge 1308 of the gap controller 1305. Also, the leading edge 1307 of the gate valve 1302, while downstream of the downstream edge 1308 of the gap controller 1305, is higher up ("up" meaning in the direction of travel of the gate 1302 when it is moving towards its open position as shown in FIG. 14) in the channel 1309 than the downstream leading edge 1308 of the gap controller 1305. Furthermore, the said gap is angled at preferably 45 degrees away from the axis of flow of the particulate material in the channel 1309.

The gap 1306 is set so that when the gate valve 1302 is closed the width of the gap 1306 is approximately 10% larger than the average diameter of the granules to be applied. Satisfactory operation depends very largely on this relationship, so rather than providing the facility for adjustment by users (with the likelihood of at least occasional adjustment errors), the gap 1306 is preferably factory-set for a specific range of materials. Other settings can be provided for specific needs.

In addition, immediately downstream of the gap controller 1305 the base 1310 of the flow channel 1309 falls away downwards by about 75% (or more) of the distance of travel of the gate valve 1302 from its open to its closed position. Therefore as the gate valve 1302 closes down toward that base 1310, there is a relatively large space available for lumps of material to be pushed out of its way, thus minimizing the possibility of obstructions causing difficulties and maximizing freedom of movement of the gate valve 1302.

The downstream edge 1308 of the gap controller 1305 is made preferably blunt rather than sharp or narrow to reduce the possibility of any lumps of material becoming stuck on that edge 1308.

Although many individual particles of the granular material can pass through the gap 1306 when individually addressed to it, when collectively "dumped" against the gate 1302 and the gap 1306 (as happens on every closure of the gate 1302), flow is immediately arrested by reason of the well-known bridging effect.

In its present form as required by production nurseries, the operating module 101 is designed primarily for the application of controlled-release types of fertilizers which are manufactured with unique coatings performing a special function in the control of the release of nutrients to plants. As such, these coatings should not be damaged. The arrangement described eliminates almost all damage.

As the materials are granular, valve closure against any solid object (such as would apply if no gap was provided) would inevitably result, at times, in complete closure being at least difficult and sometimes not possible unless that closure was driven by considerable force. That kind of force is not appropriate here, as the operating module 101 must be light for ergonomic reasons and therefore a large-capacity battery is impracticable.

For optimum user satisfaction it is preferable that one battery charge delivers a considerably larger number of shots than one manual user can conceivably deliver in a normal day (on a potting machine etc, the numbers are unlimited because battery charging can be simultaneous). By the preferred arrangement, such a performance goal has been exceeded by over 50%, and valve closure problems virtually disappear.

A microprocessor is installed into the body of the operating module, and all techniques incorporated in the program, which is written in the Assembler language, are believed to be in the public domain and within the knowledge and competence of any persons experienced in the use of this language.

The program cycles continuously and acts on instructions entered manually via the switches 413, 414, 415, 416 & 412 and trigger 406 or a trigger via socket 701, and on the presence of certain conditions on which it is programmed to operate and to report through the display 308.

If the unit is not used for a full 5 minutes (factory setting) it automatically reverts to the "powered down" or "sleep" mode, drawing about 1 milliampere of battery current which for all practical purposes is "Off". In this mode none of the functions are available and although operators can use the "Off" switch 412, there is therefore never any operational need to switch off. In this mode it can be safely stored for some months, but for longest life the battery should be fully recharged every two months.

From this sleep mode, the processor becomes operational when the "On/Off" switch 412 is pressed, immediately flashing "Ready" followed by a single display point of light at 5-second intervals. This is the Default display and the unit is then in operational mode. If the required settings have already been established (Dose level, Counter etc) normal work can proceed immediately. If however the gate is already open (sensor switch 1209 being in the closed position) when the unit is brought out of "sleep" mode, the message "Gate is Open" will be displayed at 5-second intervals until the gate is closed.

Pressing the trigger 406 initiates the triggering instructions from the program to the hardware. If the safety switch 1211 contacts are open-circuit, report at 5-second intervals on the screen "Safety Switch is Open or Gate Jammed", and also send pulses (at intervals as programmed) to a buzzer (not pictured) adjacent to the display 308 as an audible warning of this status. In addition, provide a constant 5-volt potential at a circuit incorporated in the socket 701 so that if desired, this potential can be used to activate or de-activate any external device. The program is currently written so that the audible signal and the 5-volt potential both cease on activation of any one of the switches 413, 414, 415, and 416, yet continuing the display "Safety Switch is Open or Gate Jammed" until the unit is switched off. If switch 1211 contacts are closed and any blockage has been remedied, the user may proceed.

Triggering delivers an electrical pulse of the full available voltage to the coil of the solenoid 1201 to open the plunger 1205 (length of this pulse is timed electronically).

At the completion of each step of every normal triggering action (by trigger 406 or a trigger via trigger socket 701) which is an "open gate" pulse followed by a "close gate" pulse, the system checks electronically to determine whether or not the gate valve 1302 has actually opened and subsequently whether it has closed. If all is confirmed, the system is ready for the next triggering. If not, a double-action with a very short time-interval between each step is immediately performed, and immediately tested for correct completion If still not successful the process is repeated, up to the programmed maximum number of attempts. If that maximum is reached without success the system stops, and the message "Safety Switch is Open or Gate Jammed" is repeated in the display 308 every few seconds for about 60 seconds, after which the display reverts to the default or operational display. If either trigger is again activated while the fault still exists, the same steps are repeated. At any stage the user can stop all operation by use of the "On/Off" switch and carry out maintenance work.

Reference is made above to a "very short time-interval" between each step. The preferred setting is an interval of one millisecond between completion of the opening pulse and commencement of the closing pulse. Note that this interval for such corrective action is independent of the time-interval between these two points as determined from the Dose setting, this Dose Setting Interval applying only when no problem has been identified in the normal sequence. If the gate valve 1208 has been opened either manually by physical force or by use of the Menu selection "Open Gate", and if the gate 1208 is then prevented from normal closure when trigger 406 (or a trigger via trigger socket 701) is activated, the special corrective steps as described above are applied in the same way. If by chance a large lump of material obstructs proper closure of the gate valve 1302, the material is therefore either cut and/or passed through, or the system reports as described.

The solenoid 1204 is preferably of the latching type, meaning that its plunger 1205 is always attracted towards the closed position by an internal permanent magnet. However a spiral spring 1206, 1715 is located between the solenoid pin 1207 and the solenoid body 1204 and is always biased towards the open position.

When the solenoid plunger 1205 (and therefore the gate valve 1208) is closed, the permanent magnet in the solenoid body 1204 more than overcomes the opening force exerted by the spring 1206, and holds the plunger 1205 strongly in the closed position.

When a normal triggering cycle (opening followed by closure) is activated, the program first causes an "opening" pulse of pre-selected duration to be sent to the electric coil of the solenoid 1204, this pulse generating in that coil an electromagnetic field of polarity opposite to that of the permanent magnet and slightly stronger than that of the permanent magnet in the solenoid body 1204. Thus there is a small net magnetic repulsing force on the plunger 1205, and this, together with the force exerted by the spring 1206, causes the plunger 1205 to be driven to its open position up against the stop 1311.

As designed, the plunger 1205, 1404 in its open position is now sufficiently distant from the influence of the permanent magnet of the solenoid 1204 that the spring 1206 of a specific design is able to hold it in the open position (until a closing pulse occurs) even though the opening pulse has ceased.

When a closing pulse occurs, its polarity is opposite to that applied for opening of the plunger 1205, so there is not only a strong closing force exerted by the field thus generated, but this is augmented by the permanent magnet in the solenoid 1204. These together easily compress the spring 1206, 1715 and drive the plunger 1205 and therefore the gate 1208 to their closed positions.

Thus when the plunger 1205 is in either the open or the closed position and no pulse is being applied to the coil of the solenoid 1204, its plunger 1205 and therefore the solenoid gate 1208 are held in that particular position.

Opening of the solenoid plunger 1404 and thus of the gate valve 1402 by actuation via either the manual trigger 406 or by remote triggering via the remote trigger socket 701, allows granular material to flow through, the quantity depending on the type of material being applied, the angle of inclination of the channel 417 of the operating module 101, and the length of time the gate valve 1208 remains in its open position.

The microprocessor in this unit is powered by the battery 702, and controls all use of and external inputs to the battery itself. Preferred embodiments of this applicator incorporate a battery 702 in the grip portion of the operating module 101 for balance, compactness and versatility. All regulation is preferably incorporated in the program and the electronic components, and the external power supply for battery charging is therefore by use of an unregulated 24-volt 1000 mAmp DC power pack which may be supplied with the unit.

When the battery is first connected to the unit, users must ensure that the immediate display is "Ready", followed by a flashing spot of light. If this does not appear initially, the battery must be disconnected and then reconnected, again looking for the required display. On connection, one of the first functions of the processor is to read the analog voltage, convert it to a digital value and commence a series of averaging of the readings taken at short intervals. When the charging current is applied through the socket 410, the microprocessor also detects this, and because its initial application causes a momentary high peak voltage, the averaging system eliminates that peak as being non-representative of average levels. When the battery average reading reduces to one of the three levels set for "Battery Low Level" (default 15.0V), "Recharge Now Level" (default 14.7V) and "Stop Level" (default 14.4V), the system reports accordingly on the display.

In the case of "Stop Level", the system prevents further operational activity while continuing to flash the message "Stopped, Battery Low" for 60 seconds, at the end of which it reverts to "Recharge Now" display. If before the battery is recharged the trigger is pressed again, it stops again, and so on. This latter feature is most important, because otherwise when the battery level is becoming close to the point where performance would be impaired, intermittent operation would occur.

During charging the display continuously reports on one of two levels—a) "Charging" meaning the input (current setting, but capable of being varied by program change) is 350 mA, and b) when fully charged, "Trickle", which is a rate of 42 mA (current setting only) to prevent overcharging.

At all times during charging, due to the additional level required from the charger, the voltage reading is higher than the actual battery voltage. Therefore the battery status is not available to the user when the battery is on charge.

A Nickel-Metal-Hydride battery pack is preferably used. This type of battery has several features including high energy-density and long life. Another positive feature is that its discharge curve is close to flat over a long performance range. However, except under certain conditions a measure of its voltage level has very little meaning as a measure of remaining operational capacity, so it is more difficult to report what the remaining battery capability really is.

This problem has been resolved to advantage by the adoption of two factors the use of a single-coil solenoid instead of a dual-coil, and the use of a "flag" system in the software. The term "ampere turns" means the product of current flow in amperes and the number of turns of an electric coil, and is a measure of the magnetizing/demagnetizing strength of the coil. Therefore in broad terms, the same magnetizing strength can be achieved by doubling (for example) the number of coil turns and halving the amperage draw. For a given solenoid size and physical space, a single-coil type provides the greater number of turns and the lower amperage.

Notwithstanding the increased complexity of the electronic components and the program to achieve the efficient reversal of current on the closure stroke without loss of driving force, this virtual halving of power consumption has enabled the operational use of the battery and consequently the battery reporting to be restricted to a narrower voltage range while still providing adequate performance within that range from one fully-charged battery.

The unit's program uses a flag with value always either "Set" or "Not Set". The User Menu has an option "Battery" which when requested always gives one of two answers, either a % which is indicative of the operational battery capacity remaining before it should be recharged, or the display "Not Available". When the % is displayed, it is the percentage within a selected range of voltages within which performance is fully satisfactory, e.g., 1% would mean it is close to the lower level. (The upper level in the present embodiment is 16.3V, the lower is the current setting for "Recharge Now".)

If the battery is being charged or if Flag is "Not Set", the answer to the Menu item "Battery" is always "Not Available". Otherwise (i.e., Flag is "Set" and battery is not being charged) the system displays a percentage as above. Depending on the state of calculations of actual battery voltage level, the initial display is sometimes "Wait" for several seconds, followed by the percentage figure.

When any battery is first connected to the unit, even if that battery has immediately beforehand been fully charged, the program always makes the flag "Not Set" and therefore a battery reading request at that stage is answered by "Not Available". The reason for this is that although the processor can read the actual voltage of the battery, before it can report realistically on remaining capacity it requires more information which will become available to it only after this particular connection has been brought up to a fully recharged position.

During charging the flag value remains as it was at commencement of charging (whether "Not Set" or "Set") until at a point when it is again fully charged. At that point the chemistry of the battery is such that the voltage actually takes a small but distinct downward turn. The continuous voltage monitoring by the program detects this decline, reduces the charge rate to "Trickle" and, if the flag was "Not Set" it is changed to "Set". If already "Set", that value is retained.

As the battery becomes depleted through use, the flag remains "Set" (and therefore a % reading is available) until the battery level is reduced to another pre-set level, which currently is taken as the "Battery Low" voltage. At that point the flag is again made "Not Set", so again the % reading is not available on the display.

In place of such a reading the system automatically flashes the warning "Battery Low" every few seconds, changing to "Recharge Now" after a predetermined further reduction in the battery voltage, and actually causing a complete stop at a predetermined still lower level, as stated at paragraph 6.5.6.

The above arrangements avoid the reporting of misleading percentages in certain situations and users have adequate warning of the need to recharge the battery The available settings are from 1 to 150, setting 1 being the smallest dose quantity simply because on that setting the gate valve 1402 remains open for the shortest available time. These readings are not dose quantities, but merely markersettings, and users must test with their particular granular material and other conditions to determine the setting for the dose required in each situation.

Dose setting fixes the duration of the interval between completion of the "open" pulse and commencement of the "close" pulse. Duration of these two pulses themselves are preferably factory-set and cannot be altered by the user. So if a different dose is required, the user "OK's" the Menu item Dose, which then displays the current setting, the arrows are used to make changes, the actual quantity is tested again, and so on For a given setting of the Recycle Interval the program is written so that whatever the current Dose setting is, the current Recycle Interval is always calculated to be the time interval between completion of one cycle and commencement of the next. It is not the interval between commencement of cycles, because (on that basis) if the Recycle Interval was short and the Dose setting long, the next cycle would theoretically commence before completion of the previous one.

Operation of the (user) Menu switch 413 shows the options in sequence—

Result if "OK" is Pressed within 10 Seconds
Dose Digital reading of the current setting
Battery The % if available, otherwise "Not Avail"
Job Count The number of shots delivered on the current job
Job Reset Current job count is reset to zero
Total Count The number of shots delivered to date
Recycle Interval Interval between recycle shots (see 6.9.3)
Open Gate The gate opens and remains open, continuously flashing the warning "Gate is Open". (Close by trigger) and also emitting an audible signal warning of this status, using a buzzer (not pictured) adjacent to the display 308. See also 6.10.3 below
Software Identification of the current software version.

In the case of "Dose", and "Recycle Interval", the user can change the settings up or down by use of the buttons 415 and 416 with arrows Re "Open Gate"—the message "Gate is Open" and the audible signal are repeated continuously until the unit enters "sleep" mode (automatically or manually), and on reactivation the message and the signal are again repeated as before until the gate is closed. When the display and the audible signal are active, the user can cancel the audible signal by pressing any one of the switches 413, 414, 415, and 416, leaving the visual display to continue but ceasing as before when in "sleep" mode.

The System Set-up Menu is available only to qualified personnel who may be required to make changes to existing models in the event that experience has shown such alterations to be desirable. Selection of this menu is by pressing and holding down specific keys in a specific sequence for a specific time, a general procedure which is well known to experienced programmers. When the Menu appears, the following options are made available by pressing the Menu button in sequence. To access the value, press "OK", then for those to be changed, use the arrow buttons. The table below shows exemplary current Factory Default Settings in brackets.

Open pulse Duration of pulse to open gate valve (50 ms)
Close pulse Duration of pulse to close gate valve (120 ms)
Battery Low Level Level at which "Battery Low" displays (15.0V)
Recharge Now Level Level for display "Recharge Now" (14.7V)
Stop Level Level at which operation ceases (14.4V)
Recycle Delay Time before recycling starts (2.5 sec)
Power Down Time to power-down if inactive (5 min.)
Reset Default Resets all applicable values to Factory Defaults
Battery Shows current actual battery voltage, not %

Note that the duration of either the opening or the closing pulses required to achieve satisfactory performance will depend greatly on the particular characteristics of the hardware, especially its physical size, the mass of its moving parts, the strength of the permanent magnet in the solenoid 1204, the strength of the magnetic field generated by the electric pulses to the coil of the solenoid 1204, and the distance of travel of the gate valve 1208. Likewise, such characteristics may make any or all of the other Default Settings listed above inappropriate.

While the invention has been described with reference to particular details of construction, these should not be interpreted as limitations to the scope of the invention as defined by the claims.

What is claimed is:

1. A hand held applicator device for dry particulate matter comprising:
    an operating module comprising a body having a handle and trigger, within which body is located a channel comprising a flow path that is at least partially blocked and fully opened by a battery operated gate valve that can be operated by the trigger;
    the gate valve being associated with a cooperating slot through which it enters the channel;
    the flow path being tapered to a discharge point that is downstream of the cooperating slot;
    there being a gap between the gate valve and the discharge point.

2. The device of claim 1, wherein:
    the device further comprises a flexible storage tube, with a free end, the tube being long enough to pass around a user's neck when the operating module is held by a hand of the user's extended arm, so that the free end can be manipulated by the user's other hand.

3. The device of claim 2, wherein:
    the free end supports a handle that can rotate about the tube.

4. The device of claim 1, wherein:
    the gate valve, when fully extended leaves an axial gap in the flow path.

5. The device of claim 1, wherein:
    the trigger activates a solenoid that is connected to the gate valve.

6. The device of claim 1, further comprising:
    a flow control module that is connectable at one end to the flow path and connectable at an opposite end to a supply of particulate matter, the flow control module further comprising an internal sliding shutter.

7. The device of claim 1, further comprising:
    a microprocessor that is adapted to regulate the operation of the gate valve, thus adjusting a duration of the gate valve's interval of opening so as to adjust the quantity of particulate matter dispensed according to inputs received by the microprocessor from a user, those inputs made through electronic controls located on the body of the operating module.

8. The device of claim 1, wherein:
    the body further comprises an inspection hatch located adjacent to the gate valve.

9. The device of claim 1, wherein:
    the gap is about 1.5 mm and the device is adapted to dispense fine particulate matter having a particle diameter of about 1 mm.

10. The device of claim 1, wherein:
    the gate valve is "z" shaped.

11. A portable and hand held applicator device for dry particulate matter, not having a back-pack storage reservoir, comprising:

an operating module comprising a body having a handle and trigger, within which body is located a channel comprising a flow path that is at least partially blocked by a gate valve that can be operated by the trigger;

the gate valve being associated with a cooperating slot through which it enters the channel;

the flow path being tapered to a discharge point that is downstream of the cooperating slot;

there being a gap between the gate valve and the discharge point; the device further comprising a flexible storage tube that supplies the flow path and is closed at a distal end.

12. The device of claim 11, wherein:

the tube further comprising a spiral reinforcement.

13. The device of claim 11, wherein:

the tube is long enough to pass around a user's neck when the operating module is held by a hand of the user's extended arm, so that the distal end can be manipulated by the user's other hand.

14. The device of claim 11, wherein:

a second handle is located on the tube adjacent to the distal end.

15. The device of claim 14, wherein:

the second handle is adapted to rotate completely about the tube but can also be fixed in one position.

16. The device of claim 11, wherein:

a flow control module is interposed between the operating module and the tube.

17. The device of claim 16, wherein:

the flow control module further comprises an internal sliding shutter.

* * * * *